US012760515B2

(12) United States Patent
Bartnik Johansson et al.

(10) Patent No.: US 12,760,515 B2
(45) Date of Patent: Oct. 13, 2026

(54) ROOF SYSTEM

(71) Applicant: ROCKWOOL A/S, Hedehusene (DK)

(72) Inventors: Dorte Bartnik Johansson, Hedehusene (DK); Miroslav Nikolic, Hedehusene (DK); Charlotte Lind, Hedehusene (DK)

(73) Assignee: Rockwool A/S, Hedehusene (DK)

( * ) Notice: Subject to any disclaimer, the term of this patent is extended or adjusted under 35 U.S.C. 154(b) by 570 days.

(21) Appl. No.: 18/259,355

(22) PCT Filed: Oct. 1, 2021

(86) PCT No.: PCT/EP2021/077186
§ 371 (c)(1),
(2) Date: Jun. 26, 2023

(87) PCT Pub. No.: WO2022/144108
PCT Pub. Date: Jul. 7, 2022

(65) Prior Publication Data

US 2024/0076876 A1 Mar. 7, 2024

(51) Int. Cl.
*E04B 1/86* (2006.01)
*B01J 20/24* (2006.01)
(Continued)

(52) U.S. Cl.
CPC ................ *E04B 1/86* (2013.01); *B01J 20/24* (2013.01); *B01J 20/28004* (2013.01);
(Continued)

(58) Field of Classification Search
CPC ........ E04B 1/86; E04B 1/88; E04B 2001/742; E04B 2001/8461; B01J 20/24;
(Continued)

(56) References Cited

U.S. PATENT DOCUMENTS 3,093,604 A 6/1963 Ayers
3,285,801 A 11/1966 Sargent
(Continued)

FOREIGN PATENT DOCUMENTS

CA 2277286 7/1998
CN 2351274 12/1999
(Continued)

OTHER PUBLICATIONS

International Search Report and Written Opinion, International Application No. PCT/EP2020/059645, mail date Dec. 14, 2020.
(Continued)

*Primary Examiner* — Matthew D Matzek
(74) *Attorney, Agent, or Firm* — SALIWANCHIK, LLOYD & EISENSCHENK

(57) ABSTRACT

The invention relates to a flat roof structure comprising a water attenuation layer comprising at least one water attenuation layer comprising at least one water attenuation element formed of man-made vitreous fibres bonded with a cured binder composition. The flat roof structure further comprises a water reducing layer below the water attenuation layer, and at least one drainage point in fluid communication with the water attenuation layer and arranged to direct water from the flat roof structure towards the ground. The binder is an aqueous composition free of phenol and formaldehyde comprising:

a component (i) in form of one or more lignosulfonate lignins having a carboxylic acid group content of 0.03 to 2.0 mmol/g, based on the dry weight of the lignosulfonate lignins, a component (ii) in form of one or more cross-linkers.

40 Claims, 2 Drawing Sheets

(51) Int. Cl.

| | |
|---|---|
| ***B01J 20/28*** | (2006.01) |
| ***B01J 20/30*** | (2006.01) |
| ***B32B 3/18*** | (2006.01) |
| ***B32B 5/02*** | (2006.01) |
| ***B32B 5/10*** | (2006.01) |
| ***B32B 5/26*** | (2006.01) |
| ***B32B 17/02*** | (2006.01) |
| ***B32B 37/12*** | (2006.01) |
| ***C04B 14/46*** | (2006.01) |
| ***C04B 20/00*** | (2006.01) |
| ***C04B 24/32*** | (2006.01) |
| ***C04B 26/02*** | (2006.01) |
| ***C08J 5/04*** | (2006.01) |
| ***C08K 13/02*** | (2006.01) |
| ***C08L 97/00*** | (2006.01) |
| ***D04H 1/4209*** | (2012.01) |
| ***D04H 1/4218*** | (2012.01) |
| ***D04H 1/587*** | (2012.01) |
| ***D04H 1/60*** | (2006.01) |
| ***D04H 1/72*** | (2012.01) |
| ***E01C 13/08*** | (2006.01) |
| ***E04B 1/88*** | (2006.01) |
| ***E04D 11/02*** | (2006.01) |
| ***E04D 13/04*** | (2006.01) |
| *C04B 103/30* | (2006.01) |
| *C04B 111/52* | (2006.01) |
| *C08K 3/22* | (2006.01) |
| *C08K 5/053* | (2006.01) |
| *C08K 5/07* | (2006.01) |
| *C08K 5/1515* | (2006.01) |
| *C08K 5/1545* | (2006.01) |
| *C08K 5/17* | (2006.01) |
| *C08K 5/20* | (2006.01) |
| *C08K 5/21* | (2006.01) |
| *E04B 1/74* | (2006.01) |
| *E04B 1/84* | (2006.01) |
| *E04D 11/00* | (2006.01) |

(52) U.S. Cl.

CPC ..... *B01J 20/28023* (2013.01); *B01J 20/2803* (2013.01); *B01J 20/3042* (2013.01); *B32B 3/18* (2013.01); *B32B 5/02* (2013.01); *B32B 5/10* (2013.01); *B32B 5/26* (2013.01); *B32B 17/02* (2013.01); *B32B 37/1207* (2013.01); *C04B 14/46* (2013.01); *C04B 20/0048* (2013.01); *C04B 24/32* (2013.01); *C04B 26/02* (2013.01); *C08J 5/0405* (2021.05); *C08K 13/02* (2013.01); *C08L 97/005* (2013.01); *D04H 1/4209* (2013.01); *D04H 1/4218* (2013.01); *D04H 1/587* (2013.01); *D04H 1/60* (2013.01); *D04H 1/72* (2013.01); *E01C 13/08* (2013.01); *E04B 1/88* (2013.01); *E04D 11/02* (2013.01); *E04D 13/0404* (2013.01); *B01J 2220/4837* (2013.01); *B32B 2037/1253* (2013.01); *B32B 2250/02* (2013.01); *B32B 2260/023* (2013.01); *B32B 2260/046* (2013.01); *B32B 2262/101* (2013.01); *B32B 2262/16* (2021.05); *B32B 2307/304* (2013.01); *B32B 2307/72* (2013.01); *B32B 2307/7265* (2013.01); *B32B 2307/7376* (2023.05); *B32B 2419/06* (2013.01); *C04B 2103/30* (2013.01); *C04B 2111/52* (2013.01); *C04B 2201/30* (2013.01); *C08K 3/22* (2013.01); *C08K 5/053* (2013.01); *C08K 5/07* (2013.01); *C08K 5/1515* (2013.01); *C08K 5/1545* (2013.01); *C08K 5/17* (2013.01); *C08K 5/20* (2013.01); *C08K 5/21* (2013.01); *C08K 2201/014* (2013.01); *C08L 2205/06* (2013.01); *C08L 2312/00* (2013.01); *D10B 2401/063* (2013.01); *D10B 2505/18* (2013.01); *E01C 2201/10* (2013.01); *E01C 2201/16* (2013.01); *E01C 2201/20* (2013.01); *E04B 2001/742* (2013.01); *E04B 2001/8461* (2013.01); *E04D 11/002* (2013.01)

(58) Field of Classification Search

CPC ............ B01J 20/28004; B01J 20/28023; B01J 20/2803; B01J 20/3042; B01J 2220/4837; B32B 3/18; B32B 5/02; B32B 5/10; B32B 5/26; B32B 17/02; B32B 37/1207; B32B 2037/1253; B32B 2250/02; B32B 2260/023; B32B 2260/046; B32B 2262/101; B32B 2262/16; B32B 2307/304; B32B 2307/72; B32B 2307/7265; B32B 2307/7376; B32B 2419/06; C04B 14/46; C04B 20/0048; C04B 24/32; C04B 26/02; C04B 2103/30; C04B 2111/52; C04B 2201/30; C08J 5/0405; C08K 13/02; C08K 3/22; C08K 5/053; C08K 5/07; C08K 5/1515; C08K 5/1545; C08K 5/17; C08K 5/20; C08K 5/21; C08K 2201/014; C08L 97/005; C08L 2205/06; C08L 2312/00; D04H 1/4209; D04H 1/4218; D04H 1/587; D04H 1/60; D04H 1/72; E01C 13/08; E01C 2201/10; E01C 2201/16; E01C 2201/20; E04D 11/02; E04D 13/0404; E04D 11/002; D10B 2401/063; D10B 2505/18; Y02A 30/254; Y02B 80/32

USPC .......................................................... 442/173

See application file for complete search history.

(56) References Cited

U.S. PATENT DOCUMENTS

| | | | | |
|---|---|---|---|---|
| 3,923,532 | A | 12/1975 | Morman | |
| 5,318,990 | A | 6/1994 | Strauss | |
| 5,382,608 | A | 1/1995 | Gardzielia | |
| 6,238,475 | B1 | 5/2001 | Gargulak et al. | |
| 6,706,853 | B1 | 3/2004 | Stanssens et al. | |
| 6,818,699 | B2 | 11/2004 | Kajimaru et al. | |
| 8,623,234 | B2 | 1/2014 | Jaffrennou | |
| 10,435,329 | B2 | 10/2019 | Allais et al. | |
| 2003/0042344 | A1 | 3/2003 | Fisch et al. | |
| 2004/0034154 | A1 | 2/2004 | Tutin et al. | |
| 2006/0150494 | A1 | 7/2006 | Masson | |
| 2007/0173588 | A1 | 7/2007 | Espiard et al. | |
| 2010/0069662 | A1 | 3/2010 | Udo et al. | |
| 2011/0159768 | A1 | 6/2011 | Crescimanno et al. | |
| 2011/0223364 | A1* | 9/2011 | Hawkins .............. | C09D 133/02 428/292.1 |
| 2013/0283688 | A1 | 10/2013 | Naerum et al. | |
| 2014/0039146 | A1 | 2/2014 | Abidal | |
| 2014/0094562 | A1 | 4/2014 | Hagiopol et al. | |
| 2014/0190107 | A1* | 7/2014 | Beckers .................. | E04D 13/16 156/90 |
| 2014/0314485 | A1 | 10/2014 | Emborg | |
| 2017/0198142 | A1 | 7/2017 | Hampson et al. | |
| 2018/0002225 | A1* | 1/2018 | Allais ...................... | C08K 5/54 |
| 2018/0009708 | A1 | 1/2018 | Allais | |
| 2018/0201542 | A1 | 7/2018 | Hansen | |
| 2019/0338168 | A1 | 11/2019 | Laine et al. | |

(56) References Cited

U.S. PATENT DOCUMENTS

| | | | | |
|---|---|---|---|---|
| 2021/0282335 | A1* | 9/2021 | Warmerdam | E04D 11/002 |
| 2022/0106508 | A1* | 4/2022 | Johansson | D04H 1/4209 |

FOREIGN PATENT DOCUMENTS

| | | | | |
|---|---|---|---|---|
| CN | 1944014 | A | 4/2007 | |
| CN | 107286873 | | 10/2017 | |
| DE | 42 26 329 | | 5/1993 | |
| DE | 10 2004 047193 | | 9/2005 | |
| EP | 0148050 | | 7/1985 | |
| EP | 0367194 | | 10/1989 | |
| EP | 0583086 | | 2/1994 | |
| EP | 0990727 | | 4/2000 | |
| EP | 0996653 | | 5/2000 | |
| EP | 1578879 | | 1/2007 | |
| EP | 1741726 | | 1/2007 | |
| EP | 1770123 | A1 | 4/2007 | |
| EP | 1889859 | | 2/2008 | |
| EP | 1897433 | | 3/2008 | |
| EP | 1457107 | | 5/2012 | |
| EP | 2909384 | B1 | 8/2015 | |
| EP | 3299421 | | 3/2018 | |
| EP | 3348725 | | 7/2018 | |
| EP | 2721102 | | 9/2018 | |
| EP | 3632866 | | 4/2020 | |
| EP | 3632866 | A1 * | 4/2020 | C03C 25/26 |
| EP | 3670743 | A1 | 6/2020 | |
| EP | 3250534 | | 12/2020 | |
| FR | 2976583 | | 12/2012 | |
| FR | 2976584 | | 12/2012 | |
| FR | 2976585 | | 12/2012 | |
| FR | 3032194 | | 8/2016 | |
| FR | 3032195 | | 8/2016 | |
| GB | 2113517 | | 8/1983 | |
| GB | 2177048 | | 1/1987 | |
| SE | 1950773 | | 12/2020 | |
| WO | 87/07520 | | 12/1987 | |
| WO | 93/04242 | | 3/1993 | |
| WO | 95/34517 | | 12/1995 | |
| WO | 98/31763 | | 7/1998 | |
| WO | 98/31825 | | 7/1998 | |
| WO | 98/31895 | | 7/1998 | |
| WO | 99/09270 | A1 | 2/1999 | |
| WO | 99/36368 | | 7/1999 | |
| WO | 00/57101 | | 9/2000 | |
| WO | 01/05725 | | 1/2001 | |
| WO | 01/96460 | | 12/2001 | |
| WO | 02/06178 | | 1/2002 | |
| WO | 02/066877 | | 8/2002 | |
| WO | 2004/007615 | | 1/2004 | |
| WO | 2004/033194 | | 4/2004 | |
| WO | 2005/095727 | | 10/2005 | |
| WO | 2006/061249 | | 6/2006 | |
| WO | 2008/009278 | | 1/2008 | |
| WO | 2008/009460 | | 1/2008 | |
| WO | 2008/009461 | | 1/2008 | |
| WO | 2008/009462 | | 1/2008 | |
| WO | 2008/009465 | | 1/2008 | |
| WO | 2008/009467 | | 1/2008 | |
| WO | 2008/023032 | | 2/2008 | |
| WO | 2008/073186 | | 6/2008 | |
| WO | 2008/155401 | | 12/2008 | |
| WO | 2009/090053 | | 7/2009 | |
| WO | 2010/003677 | | 1/2010 | |
| WO | 2010/046074 | | 4/2010 | |
| WO | 2010/093785 | | 8/2010 | |
| WO | 2011/042610 | | 4/2011 | |
| WO | 2011/044490 | | 4/2011 | |
| WO | 2012/028650 | | 3/2012 | |
| WO | 2012/076462 | | 6/2012 | |
| WO | 2012/113058 | | 8/2012 | |
| WO | 2012/167252 | | 12/2012 | |
| WO | 2012/172262 | | 12/2012 | |
| WO | 2013/034376 | | 3/2013 | |
| WO | 2013/060634 | | 5/2013 | |
| WO | 2013/072082 | | 5/2013 | |
| WO | 2013/113410 | | 8/2013 | |
| WO | 2014/029872 | | 2/2014 | |
| WO | 2014/029873 | | 2/2014 | |
| WO | 2015/022550 | | 2/2015 | |
| WO | 2016/009054 | | 1/2016 | |
| WO | 2016/120575 | | 8/2016 | |
| WO | 2016/120576 | | 8/2016 | |
| WO | 2016/120579 | | 8/2016 | |
| WO | 2017/074771 | | 5/2017 | |
| WO | 2017/114723 | | 7/2017 | |
| WO | 2017/114724 | | 7/2017 | |
| WO | 2017/194718 | | 11/2017 | |
| WO | 2017/194722 | | 11/2017 | |
| WO | 2018/158677 | | 9/2018 | |
| WO | 2018/193166 | | 10/2018 | |
| WO | 2018/206132 | | 11/2018 | |
| WO | 2019/202475 | | 10/2019 | |
| WO | 2019/202477 | | 10/2019 | |
| WO | 2020/008311 | | 1/2020 | |
| WO | 2020/018599 | | 1/2020 | |
| WO | 2020/058384 | | 3/2020 | |
| WO | 2020/070337 | | 4/2020 | |
| WO | 2020/070341 | | 4/2020 | |
| WO | 2020/104523 | | 5/2020 | |
| WO | 2020/109983 | | 6/2020 | |
| WO | 2020/261087 | | 12/2020 | |
| WO | 2021/124125 | | 6/2021 | |
| WO | 2021/197626 | | 10/2021 | |
| WO | 2021/198474 | | 10/2021 | |

OTHER PUBLICATIONS

International Search Report and Written Opinion, International Application No. PCT/EP2021/058706, mail date Jun. 17, 2021.

International Search Report/Written Opinion, PCT/EP2020/059653, mail date Dec. 9, 2020, PCT/ISA/210, PCT/ISA/220, PCT/ISA/237.

Xiangwei Zhu et al., Bio-Based Wood Adhesive from Camelina Protein (a Biosiesel Residue) and Depolymerized Lignin with Improved Water resistance, ACS Omega, Nov. 16, 2017, vol. 2, No. 11, 7996-8004.

International Search Report, International Application No. PCT/EP2019/077133, mail date Dec. 9, 2019, 6 pages.

International Search Report and Written Opinion, International Application No. PCT/EP2020/059645, mail date Feb. 23, 2021, 17 pages.

International Search Report and Written Opinion, International Application No. PCT/EP2020/059649, mail date Oct. 21, 2020, 13 pages.

International Search Report and Written Opinion, International Application No. PCT/EP2020/059619, mail date Dec. 7, 2020, 22 pages.

International Search Report and Written Opinion, International Application No. PCT/EP2020/059671, mail date Jan. 18, 2021, 12 pages.

International Search Report and Written Opinion, International Application No. PCT/EP2020/059636, mail date Dec. 11, 2020, 20 pages.

International Search Report and Written Opinion, International Application No. PCT/EP2020/059670, mail date Jan. 18, 2021, 12 pages.

International Search Report and Written Opinion, International Application No. PCT/EP2020/059666, mail date Jan. 25, 2021, 14 pages.

International Search Report and Written Opinion, International Application No. PCT/EP2020/059651, mail date Jan. 25, 2021, 15 pages.

International Search Report and Written Opinion, International Application No. PCT/EP2020/059650, mail date Dec. 10, 2020, 17 pages.

International Search Report and Written Opinion, International Application No. PCT/EP2020/059660, mail date Jan. 18, 2021, 12 pages.

(56) References Cited

OTHER PUBLICATIONS

International Search Report and Written Opinion, International Application No. PCT/EP2020/059655, mail date Jan. 18, 2021, 13 pages.
International Search Report and Written Opinion, International Application No. PCT/EP2020/059617, mail date Dec. 15, 2020, 16 pages.
International Search Report, International Application No. PCT/EP201/076123, mail date Oct. 21, 2019, 4 pages.
International Search Report and Written Opinion, International Application No. PCT/EP2020/059656, mail date Dec. 18, 2020, 16 pages.
International Search Report and Written Opinion, International Application No. PCT/EP2020/059659, mail date Jan. 18, 2021.
Masoumeh Ghorbani et al., Ammoxidized Fenton-Activated Pine Kraft Lignin Accelerates Synthesis and Curing of Resole Resins, Polymers 2017, 9, 43.
Dietrich Meier et al., Conversion of Technical Lignins into Slow-Release Nitrogenous Fertilizers by Ammoxidation in Liquid Phase, Bioresource Technology, 49, 1994, 121-128.
Richard J.A. Gosselink et al., Effect of periodate on lignin for wood adhesive application, International Journal of the Biology, Chemistry, Physics and Technology of Wood, vol. 65, No. 2, Jan. 1, 2011, pp. 155-162.
Venla Hemmila et al., Lignin: an adhesive raw material of the future or waste of research energy?, Northern European Network for Wood Science and Engineering (WSE), Sep. 11-12, 2013, pp. 98-103.
International Search Report and Written Opinion, International Application No. PCT/EP2021/077189, mail date Jan. 18, 2022.
International Search Report and Written Opinion, International Application No. PCT/EP2021/077185, mail date Jan. 18, 2022.
International Search Report and Written Opinion, International Application No. PCT/EP2021/077186, mail date Jan. 18, 2022.
International Search Report and Written Opinion, International Application No. PCT/EP2021/077191, mail date Jan. 18, 2022.
International Search Report and Written Opinion, International Application No. PCT/EP2021/077194, mail date Jan. 18, 2022.
International Search Report and Written Opinion, International Application No. PCT/2021/077183, mail date Jan. 18, 2022.
International Search Report and Written Opinion, International Application No. PCT/EP2021/077195, mail date Jan. 18, 2022.
International Search Report, International Application No. PCT/EP2021/077193, mail date Nov. 8, 2021.
International Search Report and Written Opinion, International Application No. PCT/EP2021/077135, mail date Jan. 18, 2022.
International Search Report, International Application No. PCT/EP2021/077180, mail date Jan. 18, 2022.

* cited by examiner

ROOF SYSTEM

CROSS-REFERENCE TO RELATED APPLICATIONS

This application is a national stage application of International Patent Application No. PCT/EP2021/077186, filed Oct. 1, 2021, which claims priority to International Patent Application No. PCT/EP2020/088061, filed Dec. 30, 2020, the disclosures of each of which are incorporated herein by reference in their entirety, including any figures, tables, and drawings.

The invention relates to roof systems of the type commonly known as "blue roofs", which comprise a water attenuation layer formed of a matrix of man-made vitreous fibres (MMVF) bonded with a cured binder composition.

In urban areas with a large number of buildings and pavings, flooding risk is high. When rain is heavy then a high volume of water reaches buildings and from there the ground in a short time. Often sewers cannot cope with extreme amounts of water in such a short time, resulting in flooding. However, the use of a blue roof provides means for storing or buffering water on flat roofs, thus attenuating the arrival of water into the sewers, waterways and river systems.

It is known to provide blue roof structures which are flat roofs designed to allow attenuation of rainfall during heavy rain and storm events. A blue roof will release water at a managed and controlled rate into the sewers, waterways and river systems around the building having the blue roof. Blue roofs are described by the National Federation of Roofing Contractors Limited (NFRC) in their NFCR Technical Guidance Note for the construction and design of blue roofs.

A blue roof comprises a water attenuation layer which is formed of a material which absorbs and holds incoming rain water and subsequently releases it for discharge at a controlled rate. Typically the water attenuation layer is formed of water retention elements of the honeycomb type made out of e.g. polypropylene. An example is Nophadrain ND WSE-70.

WO2020/018599A2 describes a green roof structure which can also have blue roof functionality. A green roof is a flat roof having capability to support plant growth. The structure comprises a load layer which can be a plant growth layer and a retention layer configured to retain storm water. Mineral wool is mentioned as a possible component for a layer for the roof.

It is generally also known to use layers of mineral wool as part of a green roof for provision of a water reservoir under the plant growth substrate layer.

WO2020/058384 describes a blue roof including the option for the water storage component to be formed of mineral wool.

Another example of a blue roof is that provided by ACO as their SpongeTop system. In this system the attenuation layer is formed of plates of hydrophilic compression-resistant stone wool plates. The hydrophilic stone wool plates hold and buffer water and release it either by evaporation or by controlled discharge from the roof.

Bonded MMVF, such as stone wool, products are generally produced by converting a melt made of suitable raw materials to fibres in conventional manner. The fibres are blown into a forming chamber and, while airborne and while still hot, are sprayed with a binder solution and deposited as a mat or web onto a travelling conveyor. The fibre mat is then transferred to a curing oven where heated air is blown through the mat to cure the binder and rigidly bond the mineral fibres together.

In the past, the binder resins of choice have been phenol-formaldehyde resins which can be economically produced and can be extended with urea prior to use as a binder. However, the existing and proposed legislation directed to the lowering or elimination of formaldehyde emissions have led to the development of formaldehyde-free binders such as, for instance, the binder compositions based on polycarboxy polymers and polyols or polyamines, such as disclosed in EP-A-583086, EP-A-990727, EP-A-1741726, U.S. Pat. No. 5,318,990 and US-A-2007/0173588.

Another group of non-phenol-formaldehyde binders are the addition/-elimination reaction products of aliphatic and/or aromatic anhydrides with alkanolamines, e.g., as disclosed in WO 99/36368, WO 01/05725, WO 01/96460, WO 02/06178, WO 2004/007615 and WO 2006/061249. These binder compositions are water soluble and exhibit excellent binding properties in terms of curing speed and curing density. WO 2008/023032 discloses urea-modified binders of that type which provide mineral wool products having reduced moisture take-up.

Since some of the starting materials used in the production of these binders are rather expensive chemicals, there is an ongoing need to provide formaldehyde-free binders which are economically produced.

A further effect in connection with previously known aqueous binder compositions from mineral fibres is that at least the majority of the starting materials used for the productions of these binders stem from fossil fuels. There is an ongoing trend of consumers to prefer products that are fully or at least partly produced from renewable materials and there is therefore a need to provide binders for mineral wool which are, at least partly, produced from renewable materials.

A further effect in connection with previously known aqueous binder compositions for mineral fibres is that they involve components which are corrosive and/or harmful. This requires protective measures for the machinery involved in the production of mineral wool products to prevent corrosion and also requires safety measures for the persons handling this machinery. This leads to increased costs and health issues and there is therefore a need to provide binder compositions for mineral fibres with a reduced content of corrosive and/or harmful materials.

In the meantime, a number of binders for mineral fibres have been provided, which are to a large extent based on renewable starting materials. In many cases these binder based to a large extent on renewable resources are also formaldehyde-free.

However, many of these binders are still comparatively expensive because they are based on comparatively expensive basic materials.

Formaldehyde-free binders for water-absorbing devices other than blue roofs have been proposed before. However, there are still some disadvantages associated with MMVF products prepared with these binders in terms of lower mechanical properties, when compared with MMVF products prepared with phenol-formaldehyde resins.

In addition, there is a desire to improve the water holding properties of the water attenuation layer of a blue roof, for example, drainage into the water attenuation layer, buffering, and infiltration/discharge.

Furthermore, known MMVF products for water absorption but used in applications other than blue roofs can contain wetting agents to improve hydrophilicity. However, certain wetting agents may be washed out of the MMVF product over time. This is particularly problematic as the wetting agent may leach out and contaminate the surrounding ground. In addition, as the wetting agent is washed out, the water holding properties of the device can significantly change. Finally, there is a general desire to reduce the number of components required to produce MMVF elements for both environmental and cost efficiency purposes.

Therefore, it would be desirable to produce a blue roof comprising MMVF water attenuation elements comprising a binder that is formaldehyde-free but has equivalent or superior mechanical handling properties (e.g. compression strength, wet strength, delamination strength) as phenol-formaldehyde binders, and/or relative to other formaldehyde-free binders. It would be desirable for such elements to have improved water holding properties (e.g. improved drainage, water buffering, and infiltration). Furthermore, it would be desirable for such a binder to be economical to produce and be based predominantly on renewable sources. Finally, it would be desirable for such a binder to be such that the element does not require the further addition of wetting agent and thus prevent leaching of wetting agents into the surrounding ground.

According to the invention we provide a flat roof structure comprising

- at least one water attenuation layer comprising at least one water attenuation element formed of man-made vitreous fibres (MMVF) bonded with a binder resulting from the curing of an aqueous binder composition free of phenol and formaldehyde, the aqueous binder composition comprising:
  - a component (i) in form of one or more lignosulfonate lignins having a carboxylic acid group content of 0.03 to 2.0 mmol/g, based on the dry weight of the lignosulfonate lignins,
  - a component (ii) in form of one or more cross-linkers,
- a waterproof layer below the water attenuation layer,
- and at least one drainage point in fluid communication with the water attenuation layer and arranged to direct water away from the flat roof structure.

Thus, according to the invention, heavy rainfall, even storm water, can be held within the water attenuation layer of the flat roof structure. This means that it does not run off the roof and into the sewer and waterway system immediately, but run-off is delayed.

The material that forms the water attenuation layer is MMVF, bonded with the defined cured aqueous binder composition. The MMVF structure has the capacity to absorb and hold water for a considerable period of time. It also, however, has the ability to release the water with a certain delay, defined by the so-called discharge rate.

It has been discovered that it is possible to produce a formaldehyde-free binder which results in a bonded MMVF product having equivalent mechanical handling properties (e.g. compression strength as initial strength but also as the aged strength, wet strength and delamination strength) to bonded MMVF products bonded with phenol-formaldehyde binders, and can be improved versus other formaldehyde-free binders. We have also produced such a binder that results in a bonded MMVF product that has improved water holding properties (e.g. drainage, buffering, infiltration/discharge), which is highly beneficial for water handling. Such a binder is economical and is based predominantly on renewable sources. Finally, this binder means that the addition of a wetting agent to the attenuation device is not required, preventing leaching of wetting agent into the surrounding ground and providing both environmental and cost advantages.

Preferably the flat roof structure has the technical characteristics described in the NFRC Guideline mentioned above. It should preferably attenuate water for no more than a 24-hour period from the end of the maximum designed rainfall event. The discharge rate should preferably be calculated to allow the roof to be half empty of attenuated water in a 12-hour period. The overall discharge rate can preferably be in the range of from 3 to 15 litre per second per hectare, preferably 5 to 8 litre per second per hectare of site surrounding the building having the flat roof.

The elements of the flat roof structure must have the correct structural capacity to resist the permanent (dead) load of the required finishes and any temporary (live) loading produced by maintenance/emergency vehicles or other elements. The components should be designed to accommodate the full capacity of the predicted storm water for a 24-hour period.

The flat roof structure according to the invention comprises a water attenuation element. Preferably it is formed of an array of water attenuation elements arranged in fluid communication with each other so as to form a continuous layer. Details of preferred aspects of the water attenuation elements are given below.

Below the water attenuation layer is arranged a waterproof layer. This can be formed of any of the known materials for providing the waterproof layer in a flat roof.

The flat roof structure may comprise other layers above the water attenuation layer, and/or between the water attenuation layer and the waterproof layer, and/or below the waterproof layer, depending on which structure is used.

Preferably the structure includes a discharge layer below the water attenuation layer. This is generally in fluid communication with the water attenuation layer and has the function of removing water from the attenuation layer and guiding it to the drainage points.

Preferably the flat roof structure is a warm roof structure, in which the principal thermal insulation is placed immediately below the roof covering, meaning the waterproof membrane layer, resulting in the structural deck and support being at a temperature close to that of the interior of the building. This is based on the conventional structure for a warm roof and comprises, from top to bottom: a surface/landscaping layer; optionally a substrate layer; the water attenuation layer; optionally a discharge layer; a waterproof membrane layer; a thermal insulation layer; optionally a vapour control layer; then the base structural substrate on which the flat roof is constructed.

Figure 2:
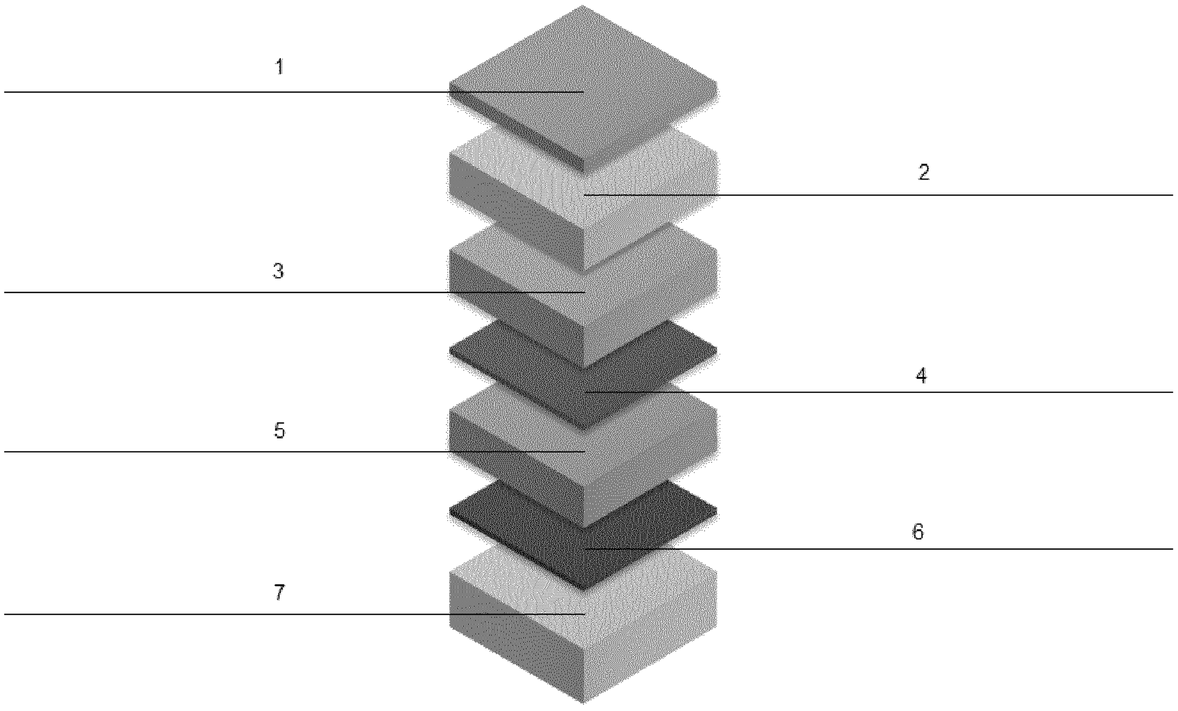
FIG. 2 shows a typical warm roof structure incorporating the water attenuation layer of the invention.

FIG. 2 illustrates an expanded view of the layers in an example of a warm roof structure. This comprises a surface/landscaping layer 1 formed of topsoil for plant growth; a substrate layer 2 formed of MMVF for retaining water for the plant growth; the water attenuation layer 3; a waterproof membrane layer 4; a thermal insulation layer 5 formed of MMVF; a vapour control layer 6; then the base structural substrate 7 on which the flat roof is constructed.

Other types of flat roof structure can be provided, for instance an inverted roof structure. This is a variant of the warm roof in which the principal thermal insulation is placed above the roof covering, resulting in the roof covering, structural deck and structural support being at a temperature close to that of the interior of the building. This is based on the conventional structure for an inverted roof and comprises, from top to bottom: a surface/landscaping layer; optionally a substrate layer; the water attenuation layer; a water flow reducing layer/discharge layer; inverted thermal insulation layer; a waterproof membrane layer; then the base structural substrate on which the flat roof is constructed.

The flat roof structure has at least one drainage point which is in fluid communication with the water attenuation layer. The connection may be direct or indirect, for instance via the discharge layer. Water which is received and held in the water attenuation layer thus can travel to the or each drainage point. The drainage point is usually connected with a gutter system so as to carry the water away from the flat roof structure. Usually it is carried downwardly towards the ground and into the sewers and waterways. The drain at the drainage point may be any of the known drain constructions for blue roofs such as described in the NFRC Guideline mentioned above, or WO2020/018599, or WO2020/058384.

Preferably the flat roof structure includes a discharge layer below the water attenuation layer. This provides a preferably multidirectional free flowing path guiding the water to the drainage points. This can also be referred to as a water flow reducing layer. As known for prior art blue roofs, it can be made of any of the known materials for such a layer, for instance recycled high impact polystyrene (HIPS) sheets combined and covered with a potential range of different geotextiles and films of e.g. Polypropylene (PP) and Polyethylene (PE). Examples are Nophadrain ND 100/120 or ND 800 and others.

The discharge layer may also comprise a layer formed of a matrix of man-made vitreous fibres (MMVF) bonded with a cured binder composition. The thickness can for instance be in the range 10 to 50 mm, preferably 15 to 30 mm.

A discharge layer may comprise two or more sub-layers—for instance a layer of MMVF and a layer of a more conventional material as mentioned above.

In one embodiment the water attenuation element comprises an integrated discharge area in its bottom part, formed of cross-cut grooves in the bottom surface of the element, such as e.g. grooves of 2×2 cm. In this way water flow to the drainage points on the roof is promoted. Thus the water attenuation layer and the discharge layer are formed by a single type of element.

The lower part forming the discharge layer can have a higher density than the upper part forming the water attenuation layer, thus providing additional compressive strength. This is especially valuable in the case where grooves are present as it can compensate for any loss in compressive strength caused by the grooves.

The flat roof structure of the invention is a blue roof, in that it has the capacity to absorb and retain and subsequently release/discharge water from the water attenuation layer. In addition it may have the characteristics of a green roof. Thus it may also be provided with one or more layers above the water attenuation layer including a growth substrate layer in which plants may be grown and optionally a water retention layer for retention of water for the plant growth.

Green roof structures are also known and any of the growth substrates which have been described for such structures can be used as a growth substrate layer in the invention. A preferred example is an MMVF growth substrate.

Such a growth substrate layer is formed of a matrix of MMVF bonded with a binder. The binder may be any of the types known for use in MMVF growth substrates. Preferably it is of the same type as the binder required as essential in the water attenuation layer.

The density of a growth substrate layer formed of MMVF is preferably in the range 40 to 80 kg/m$^3$, preferably in the range 50 to 70 kg/m$^3$. MMVF used for a growth substrate layer is preferably hydrophilic and can contain wetting agent. However, preferably it does not contain wetting agent.

A water attenuation element is hydrophilic, that is, it attracts water. Hydrophilic has its normal meaning in the art.

The hydrophilicity of the water attenuation element may be defined in terms of the contact angle with water. Preferably, the MMVF of the device has a contact angle with water of less than 90°. The contact angle is measured by a sessile drop measurement method. Any sessile drop method can be used, for example with a contact angle goniometer. In practice, a droplet is placed on the solid surface and an image of the drop is recorded in time. The static contact angle is then defined by fitting Young-Laplace equation around the droplet. The contact angle is given by the angle between the calculated drop shape function and the sample surface, the projection of which in the drop image is referred to as the baseline. The equilibrium contact angles are used for further evaluation and calculation of the surface free energy using the Owens, Wendt, Rabel and Kaeble method. The method for calculating the contact angle between material and water is well-known to the skilled person.

Hydrophilicity of the attenuation element may be defined by the hydraulic conductivity. Preferably, the attenuation element has a hydraulic conductivity of 5 m/day to 300 m/day, preferably 50 m/day to 200 m/day. Hydraulic conductivity is measured in accordance with ISO 17312:2005. The advantage of this hydraulic conductivity is that the attenuation element can absorb excess water and transfer it away with sufficient speed to prevent flooding.

The hydrophilicity of a sample of MMVF substrate can also be measured by determining the sinking time of a sample. A sample of MMVF substrate having dimensions of 100×100×100 mm is required for determining the sinking time. A container with a minimum size of 200×200×200 mm is filled with water. The sinking time is the time from when the sample first contacts the water surface to the time when the test specimen is completely submerged. The sample is placed in contact with the water in such a way that a cross-section of 100×100 mm first touches the water. The sample will then need to sink a distance of just over 100 mm in order to be completely submerged. The faster the sample sinks, the more hydrophilic the sample is. The MMVF substrate is considered hydrophilic if the sinking time is less than 120 seconds. Preferably the sinking time is less than 60 seconds. In practice, the water attenuation element may have a sinking time of a few seconds, such as less than 15 seconds, preferably less than 10 seconds.

Preferably the water attenuation element comprises at least 90 wt % man-made vitreous fibres by weight of the total solid content of the water attenuation element. An advantage of having such an amount of fibres present in the water attenuation element is that there are sufficient pores formed between the fibres to allow the device to hold large amounts of water. The remaining solid content may be made up primarily of binder.

The water attenuation element is generally substantially free of oil in order to maintain hydrophilicity.

The water attenuation element is preferably in the form of a coherent MMVF substrate i.e. a coherent mass. That is, the water attenuation element is preferably a coherent matrix of man-made vitreous fibres, which has been produced as such, but can also be formed by granulating a slab of mineral wool and consolidating the granulated material. A coherent substrate is a single, unified substrate.

The water attenuation element according to the invention may optionally comprise a wetting agent. A wetting agent has its normal meaning in the art, and may be a cationic, anionic or non-ionic surfactant.

The water attenuation element may comprise a non-ionic wetting agent such as Rewopal®.

The water attenuation element may comprise an ionic surfactant, more preferably an alkyl ether sulphate surfactant wetting agent. The wetting agent may be an alkali metal alkyl ether sulphate or an ammonium alkyl ether sulphate. Preferably the wetting agent is a sodium alkyl ether sulphate. A commercially available alkyl ether sulphate surfactant wetting agent is Texapon®. The wetting agent may also be a linear alkyl benzene sulphonate anionic surfactant.

Some non-ionic wetting agents may be washed out of the MMVF water attenuation element over time. It is therefore preferable to use an ionic wetting agent, especially an anionic wetting agent, such as linear alkyl benzene sulphonate or Texapon®. These do not wash out of the MMVF device to the same extent.

The water attenuation element may comprise 0.01 to 1 wt % wetting agent, preferably 0.05 to 0.5 wt % wetting agent, more preferably 0.1 to 0.3 wt % wetting agent.

However, it has been discovered that a wetting agent is not essential for the water attenuation element according to the invention. This is believed to be due to the nature of the binder composition. Therefore, preferably the water attenuation element does not comprise any wetting agent. By this, it is meant that the water attenuation element preferably comprises no wetting agent i.e. comprises 0 wt % wetting agent.

This has several advantages. Firstly, it reduces the number of additives in the element, which is environmentally advantageous, and also saves costs. Often wetting agents are made from non-renewable sources so it is beneficial to avoid their use. Additionally, wetting agents may be washed out of the water attenuation element. This is problematic because the wetting agent may contaminate the waterways. When a wetting agent is washed out this also changes the nature of the water attenuation element, typically changing drainage into the water attenuation layer, buffering, and discharge/infiltration, making it difficult to predict the behaviour. Avoiding the use of a wetting agent avoids these problems.

The water attenuation element comprising MMVF preferably has a density in the range of 70 to 200 kg/$m^3$, preferably 100 to 180 kg/$m^3$ and in particular in the range 120 to 150 kg/$m^3$. The advantage of this density is that the water attenuation element has relatively high compression strength. Optionally a force distribution plate is positioned on top of the water attenuation element in order to distribute the force applied to the water attenuation element. Preferably such a force distribution plate is not required due to the density of the water attenuation element.

The water attenuation element comprising MMVF preferably has volume in the range of 10 litres to 300 litres, preferably 100 litres to 250 litres, more preferably 150 litres to 200 litres. The precise volume is chosen according to the volume of water which is expected to be managed. Furthermore, multiple elements are preferably used in an array.

The water attenuation element comprising MMVF preferably has thickness greater than 50 mm, more preferably at least 55 mm. It can be at least 100 mm and preferably up to 500 mm. In particular it may be up to 200 mm, for instance up to 150 mm.

The elements are usually cuboid with two parallel major faces joined by perpendicular minor faces: They may be arranged in an array with the major faces abutting, or with the minor faces abutting. They may be arranged abutting in a horizontal array. Additionally they may be arranged in two or more layers.

The vast majority of the water attenuation element is used to buffer the amount of water that is conveyed to the water attenuation element. The larger the proportion of the water attenuation element, the greater the volume of water that can be buffered by a water attenuation element of a given cross-sectional area.

Preferably the water holding capacity of the water attenuation element is at least 80% of the volume, preferably 80-99%, most preferably 85-95%. The greater the water holding capacity, the more water that can be stored for a given volume. The water holding capacity of the water attenuation element is high due to the open pore structure and the hydrophilicity.

Preferably the amount of water that is retained by the water attenuation element when it gives off water is less than 20% vol, preferably less than 10% vol, most preferably less than 5% vol. The water retained may be 2 to 20% vol, such as 5 to 10% vol. The lower the amount of water retained by the water attenuation element, the greater the capacity of the water attenuation element to take on more water.

Preferably the buffering capacity of the water attenuation element, that is the difference between the maximum amount of water that can be held, and the amount of water that is retained when the water attenuation element gives off water, is at least 60% vol, preferably at least 70% vol, preferably at least 80% vol. The buffering capacity may be 60 to 90% vol, such as 60 to 85% vol.

The water holding capacity, the amount of water retained and the buffering capacity of the water attenuation element can be measured in accordance with EN 13041:1999.

The MMVF matrix bonded with binder can have any of the following features.

The man-made vitreous fibres (MMVF) used in the invention can be any MMVF such as, e.g., glass fibres, ceramic fibres, basalt fibres, slag wool, mineral wool and stone wool, which are bonded together by a cured binder as defined. Bonded MMVF (also described as mineral fibres) are generally produced by converting a melt made of suitable raw materials to fibres in conventional manner, for instance by a spinning cup process or by a cascade rotor process. The fibres are blown into a forming chamber and, while airborne and while still hot, are sprayed with binder solution and randomly deposited as a mat or web onto a travelling conveyor. The fibre mat is then transferred to a curing oven where heated air is blown through the mat to cure the binder and rigidly bond the mineral fibres together.

The attenuation layer of the present invention comprises MMVF in contact with a binder resulting from the curing of an aqueous binder composition free of phenol and formaldehyde comprising:

- a component (i) in form of one or more lignosulfonate lignins having a carboxylic acid group content of 0.03 to 2.0 mmol/g, such as 0.03 to 1.4 mmol/g, such as 0.075 to 2.0 mmol/g, such as 0.075 to 1.4 mmol/g, based on the dry weight of the lignosulfonate lignins,
- a component (ii) in form of one or more cross-linkers.

In particular, the binder results from the curing of an aqueous binder composition free of phenol and formaldehyde comprising:

a component (i) in form of one or more lignosulfonate lignins having a carboxylic acid group content of 0.03 to 2.0 mmol/g, such as 0.03 to 1.4 mmol/g, such as 0.075 to 2.0 mmol/g, such as 0.075 to 1.4 mmol/g, based on the dry weight of the lignosulfonate lignins, a component (ii) in form of one or more cross-linkers, with the proviso that the aqueous binder composition does not comprise a cross-linker selected from epoxy compounds having a molecular weight $M_W$ of 500 or less.

In particular, the binder results from the curing of an aqueous binder composition free of phenol and formaldehyde comprising:

a component (i) in form of one or more lignosulfonate lignins having a carboxylic acid group content of 0.03 to 2.0 mmol/g, such as 0.03 to 1.4 mmol/g, such as 0.075 to 2.0 mmol/g, such as 0.075 to 1.4 mmol/g, based on the dry weight of the lignosulfonate lignins, a component (ii) in form of one or more cross-linkers, with the proviso that the aqueous binder composition does not comprise a cross-linker selected from carbonyl compounds selected from aldehydes, carbonyl compounds of the formula $R—[C(O)R_1]_x$ in which:

R represents a saturated or unsaturated and linear, branched or cyclic hydrocarbon radical, a radical including one or more aromatic nuclei which consist of 5 or 6 carbon atoms, a radical including one or more aromatic heterocycles containing 4 or 5 carbon atoms and an oxygen, nitrogen or sulfur atom, it being possible for the R radical to contain other functional groups, $R_1$ represents a hydrogen atom or a $C_1$-$C_{10}$ alkyl radical, and x varies from 1 to 10.

In particular, the binder results from the curing of an aqueous binder composition free of phenol and formaldehyde comprising:

a component (i) in form of one or more lignosulfonate lignins having a carboxylic acid group content of 0.03 to 2.0 mmol/g, such as 0.03 to 1.4 mmol/g, such as 0.075 to 2.0 mmol/g, such as 0.075 to 1.4 mmol/g, based on the dry weight of the lignosulfonate lignins, a component (ii) in form of one or more cross-linkers, with the proviso that the aqueous binder composition does not comprise a cross-linker selected from polyamines.

In particular, the binder results from the curing of an aqueous binder composition free of phenol and formaldehyde comprising:

a component (i) in form of one or more lignosulfonate lignins having a carboxylic acid group content of 0.03 to 2.0 mmol/g, such as 0.03 to 1.4 mmol/g, such as 0.075 to 2.0 mmol/g, such as 0.075 to 1.4 mmol/g, based on the dry weight of the lignosulfonate lignins, a component (ii) in form of one or more cross-linkers, with the proviso that the aqueous binder composition does not comprise a cross-linker selected from mono- and oligosaccharides.

In one embodiment, the binder results from the curing of an aqueous binder composition free of phenol and formaldehyde comprising:

a component (i) in form of one or more lignosulfonate lignins having a carboxylic acid group content of 0.03 to 2.0 mmol/g, such as 0.03 to 1.4 mmol/g, such as 0.075 to 2.0 mmol/g, such as 0.075 to 1.4 mmol/g, based on the dry weight of the lignosulfonate lignins, a component (ii) in form of one or more cross-linkers selected from β-hydroxyalkylamide-cross-linkers, such as N-(2-hydroxyisopropyl)amide-cross-linkers, such as N-(2-hydroxyethyl)amide-cross-linkers, such as N-(2-hydroxyethyl)adipamide-cross-linkers, such as N,N,N',N'-tetrakis(2-hydroxyethyl)adipamide and/or the group consisting of multifunctional organic amines such as an alkanolamine, diamines, such as hexamethyldiamine, and/or epoxy compounds having a molecular weight of more than 500, such as an epoxidised oil based on fatty acid triglyceride or one or more flexible oligomer or polymer, such as a low Tg acrylic based polymer, such as a low Tg vinyl based polymer, such as low Tg polyether, which contains reactive functional groups such as carbodiimide groups, such as anhydride groups, such as oxazoline groups, such as amino groups, such as epoxy groups, and/or one or more cross-linkers in form of multifunctional carbodiimides, such as aliphatic multifunctional carbodiimides, and/or Primid XL-552, with the proviso that the aqueous binder composition does not comprise a cross-linker selected from epoxy compounds having a molecular weight $M_W$ of 500 or less carbonyl compounds selected from aldehydes, carbonyl compounds of the formula $R—[C(O)R_1]_x$ in which:

R represents a saturated or unsaturated and linear, branched or cyclic hydrocarbon radical, a radical including one or more aromatic nuclei which consist of 5 or 6 carbon atoms, a radical including one or more aromatic heterocycles containing 4 or 5 carbon atoms and an oxygen, nitrogen or sulfur atom, it being possible for the R radical to contain other functional groups, $R_1$ represents a hydrogen atom or a $C_1$-$C_{10}$ alkyl radical, and x varies from 1 to 10, polyamines.

Optionally, the aqueous binder composition additionally comprises a component (iii) in form of one or more plasticizers.

In one embodiment, the binder results from the curing of an aqueous binder composition free of phenol and formaldehyde comprising:

a component (i) in form of one or more lignosulfonate lignins having a carboxylic acid group content of 0.03 to 2.0 mmol/g, such as 0.03 to 1.4 mmol/g, such as 0.075 to 2.0 mmol/g, such as 0.075 to 1.4 mmol/g, based on the dry weight of the lignosulfonate lignins, a component (ii) in form of one or more cross-linkers;

a component (iii) in form of one or more plasticizers.

In particular, the binder results from the curing of an aqueous binder composition free of phenol and formaldehyde comprising:

a component (i) in form of one or more lignosulfonate lignins having a carboxylic acid group content of 0.03 to 2.0 mmol/g, such as 0.03 to 1.4 mmol/g, such as 0.075 to 2.0 mmol/g, such as 0.075 to 1.4 mmol/g, based on the dry weight of the lignosulfonate lignins, a component (ii) in form of one or more cross-linkers;

a component (iii) in form of one or more plasticizers, with the proviso that the aqueous binder composition does not comprise a cross-linker selected from epoxy compounds having a molecular weight $M_W$ of 500 or less.

In particular, the binder results from the curing of an aqueous binder composition free of phenol and formaldehyde comprising:

a component (i) in form of one or more lignosulfonate lignins having a carboxylic acid group content of 0.03 to 2.0 mmol/g, such as 0.03 to 1.4 mmol/g, such as 0.075 to 2.0 mmol/g, such as 0.075 to 1.4 mmol/g, based on the dry weight of the lignosulfonate lignins, a component (ii) in form of one or more cross-linkers;

a component (iii) in form of one or more plasticizers, with the proviso that the aqueous binder composition does not comprise a cross-linker selected from carbonyl compounds selected from aldehydes, carbonyl compounds of the formula $R—[C(O)R_1]_x$ in which:

R represents a saturated or unsaturated and linear, branched or cyclic hydrocarbon radical, a radical including one or more aromatic nuclei which consist of 5 or 6 carbon atoms, a radical including one or more aromatic heterocycles containing 4 or 5 carbon atoms and an oxygen, nitrogen or sulfur atom, it being possible for the R radical to contain other functional groups, $R_1$ represents a hydrogen atom or a $C_1$-$C_{10}$ alkyl radical, and x varies from 1 to 10.

In particular, the binder results from the curing of an aqueous binder composition free of phenol and formaldehyde comprising:

a component (i) in form of one or more lignosulfonate lignins having a carboxylic acid group content of 0.03 to 2.0 mmol/g, such as 0.03 to 1.4 mmol/g, such as 0.075 to 2.0 mmol/g, such as 0.075 to 1.4 mmol/g, based on the dry weight of the lignosulfonate lignins, a component (ii) in form of one or more cross-linkers;

a component (iii) in form of one or more plasticizers, with the proviso that the aqueous binder composition does not comprise a cross-linker selected from polyamines.

In particular, the binder results from the curing of an aqueous binder composition free of phenol and formaldehyde comprising:

a component (i) in form of one or more lignosulfonate lignins having a carboxylic acid group content of 0.03 to 2.0 mmol/g, such as 0.03 to 1.4 mmol/g, such as 0.075 to 2.0 mmol/g, such as 0.075 to 1.4 mmol/g, based on the dry weight of the lignosulfonate lignins, a component (ii) in form of one or more cross-linkers;

a component (iii) in form of one or more plasticizers, with the proviso that the aqueous binder composition does not comprise a cross-linker selected from mono- and oligosaccharides.

In one embodiment, the binder results from the curing of an aqueous binder composition free of phenol and formaldehyde comprising:

a component (i) in form of one or more lignosulfonate lignins having a carboxylic acid group content of 0.03 to 2.0 mmol/g, such as 0.03 to 1.4 mmol/g, such as 0.075 to 2.0 mmol/g, such as 0.075 to 1.4 mmol/g, based on the dry weight of the lignosulfonate lignins, a component (ii) in form of one or more cross-linkers selected from β-hydroxyalkylamide-cross-linkers, and/or epoxy compounds having a molecular weight of more than 500, such as an epoxidised oil based on fatty acid triglyceride or one or more flexible oligomer or polymer, such as a low Tg acrylic based polymer, such as a low Tg vinyl based polymer, such as low Tg polyether, which contains reactive functional groups such as carbodiimide groups, such as anhydride groups, such as oxazoline groups, such as amino groups, such as epoxy groups, and/or one or more cross-linkers in form of multifunctional carbodiimides, such as aliphatic multifunctional carbodiimides; and/or Primid XL-552;

a component (iii) in form of one or more plasticizers, with the proviso that the aqueous binder composition does not comprise a cross-linker selected from epoxy compounds having a molecular weight $M_W$ of 500 or less carbonyl compounds selected from aldehydes, carbonyl compounds of the formula $R—[C(O)R_1]_x$ in which:

R represents a saturated or unsaturated and linear, branched or cyclic hydrocarbon radical, a radical including one or more aromatic nuclei which consist of 5 or 6 carbon atoms, a radical including one or more aromatic heterocycles containing 4 or 5 carbon atoms and an oxygen, nitrogen or sulfur atom, it being possible for the R radical to contain other functional groups, $R_1$ represents a hydrogen atom or a $C_1$-$C_{10}$ alkyl radical, and x varies from 1 to 10, polyamines.

In a preferred embodiment, the binders are formaldehyde free.

For the purpose of the present application, the term "formaldehyde free" is defined to characterize a mineral wool product where the emission is below 5 μg/m²/h of formaldehyde from the mineral wool product, preferably below 3 μg/m²/h. Preferably, the test is carried out in accordance with ISO 16000 for testing aldehyde emissions.

In a preferred embodiment, the binders are phenol free.

For the purpose of the present application, the term "phenol free" is defined in such a way that the aqueous binder composition contains phenol

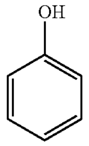

in an amount of ≤0.25 wt.-%, such as ≤0.1 wt.-%, such as ≤0.05 wt.-%, based on the total weight of an aqueous composition having a dry solids binder content of 15 wt. %.

In one embodiment, the binder composition does not contain added formaldehyde.

In one embodiment, the binder composition does not contain added phenol.

For the purpose of the present t invention, the term "mono- and oligosaccharides" is defined to comprise monosaccharides and oligosaccharides having 10 or less saccharide units.

For the purpose of the present invention, the term "sugar" is defined to comprise monosaccharides and oligosaccharides having 10 or less saccharide units.

Component (i)

Component (i) is in form of one or more lignosulfonate lignins having a carboxylic acid group content of 0.03 to 2.0 mmol/g, such as 0.03 to 1.4 mmol/g, such as 0.075 to 2.0 mmol/g, such as 0.075 to 1.4 mmol/g, based on the dry weight of the lignosulfonate lignins.

Lignin, cellulose and hemicellulose are the three main organic compounds in a plant cell wall. Lignin can be thought of as the glue, that holds the cellulose fibres together. Lignin contains both hydrophilic and hydrophobic groups. It is the second most abundant natural polymer in the world, second only to cellulose, and is estimated to represent as much as 20-30% of the total carbon contained in the biomass, which is more than 1 billion tons globally.

The lignosulfonate process introduces large amount of sulfonate groups making the lignin soluble in water but also in acidic water solutions. Lignosulfonate has up to 8% sulfur as sulfonate, whereas kraft lignin has 1-2% sulfur, mostly bonded to the lignin. The molecular weight of lignosulfonate is 15.000-50.000 g/mol. The typical hydrophobic core of lignin together with large number of ionized sulfonate groups make this lignin attractive as a surfactant and it often finds application in dispersing cement etc.

To produce lignin-based value-added products, lignin should be first separated from biomass, for which several methods can be employed. Kraft and sulfite pulping processes are known for their effective lignin separation from wood, and hence, are used worldwide. Kraft lignin is separated from wood with the help of NaOH and Na2S. Lignins from sulfite pulping processes are denoted as lignosulfonates, and are produced by using sulfurous acid and/or a sulfite salt containing magnesium, calcium, sodium, or ammonium at varying pH levels. Currently, lignosulfonates account for 90% of the total market of commercial lignin, and the total annual worldwide production of lignosulfonates is approximately 1.8 million tons. Lignosulfonates have generally abundance of sulfonic groups, and thus, a higher amount of sulfur than kraft lignin. Due to the presence of the sulfonated group, lignosulfonates are anionically charged and water soluble. The molecular weights (Mw) of lignosulfonates can be similar to or larger than that of kraft lignin. Due to their unique properties, lignosulfonates have a wide range of uses, such as animal feed, pesticides, surfactants, additives in oil drilling, stabilizers in colloidal suspensions, and as plasticizers in concrete admixtures. However, the majority of new pulp mills employ kraft technology for pulp production, and thus, kraft lignin is more readily available for value-added production.

Figure 1:
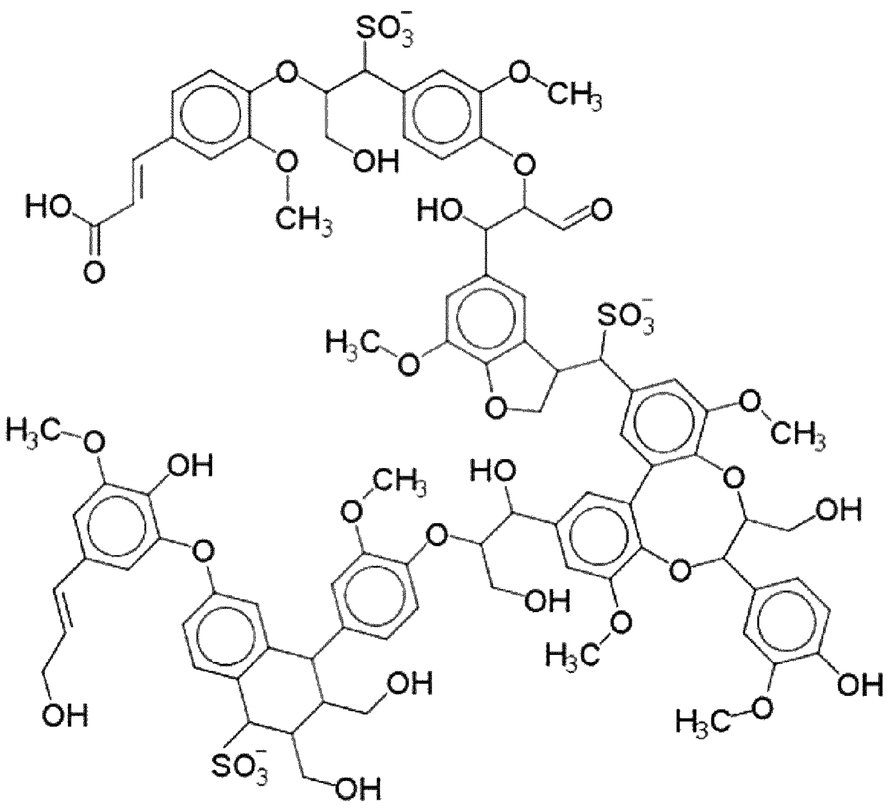
FIG. 1 shows a model structure of lignosulfonates.

However, lignosulfonates and kraft lignin have different properties coming from different isolation processes and thus distribution of functional groups. High level of sulfonic groups in lignosulfonates, generally at least one for every four C9 units, makes lignosulfonates strongly charged at all pH levels in water. This abundance of ionisable functional groups can explain most of the differences compared to other technical lignins. Higher charge density allows easier water solubility and higher solid content in solution possible compared to kraft lignin. Also, for the same reason, lignosulfonates will have lower solution viscosity compared to kraft lignin at the same solid content which can facilitate handling and processing. Commonly used model structure of lignosulfonates is shown in FIG. 1.

In one embodiment, component (i) is having a carboxylic acid group content of 0.05 to 0.6 mmol/g, such as 0.1 to 0.4 mmol/g, based on the dry weight of lignosulfonate lignins.

In one embodiment, component (i) is in form of one or more lignosulfonate lignins having an average carboxylic acid group content of less than 1.8 groups per macromolecule considering the M_n wt. average of component (i), such as less than 1.4 such as less than 1.1 such as less than 0.7 such as less than 0.4.

In one embodiment, component (i) is having a content of phenolic OH groups of 0.3 to 2.5 mmol/g, such as 0.5 to 2.0 mmol/g, such as 0.5 to 1.5 mmol/g, based on the dry weight of lignosulfonate lignins.

In one embodiment, component (i) is having a content of aliphatic OH groups of 1.0 to 8.0 mmol/g, such as 1.5 to 6.0 mmol/g, such as 2.0 to 5.0 mmol/g, based on the dry weight of lignosulfonate lignins.

In one embodiment, component (i) comprises ammoniumlignosulfonates and/or calciumlignosulfonates, and/or magnesiumlignosulfonates, and any combinations thereof.

In one embodiment, component (i) comprises ammoniumlignosulfonates and calciumlignosulfonates, wherein the molar ratio of $NH_4^+$ to $Ca^{2+}$ is in the range of 5:1 to 1:5, in particular 3:1 to 1:3.

For the purpose of the present invention, the term lignosulfonates encompasses sulfonated kraft lignins.

In one embodiment, component (i) is a sulfonated kraft lignin.

In one embodiment, the aqueous binder composition contains added sugar in an amount of 0 to 5 wt.-%, such as less than 5 wt.-%, such as 0 to 4.9 wt.-%, such as 0.1 to 4.9 wt.-%, based on the weight of lignosulfonate and sugar.

In one embodiment, the aqueous binder composition comprises component (i), i.e. the lignosulfonate, in an amount of 50 to 98 wt.-%, such as 65 to 98 wt.-%, such as 80 to 98 wt.-%, based on the total weight of components (i) and (ii).

In one embodiment, the aqueous binder composition comprises component (i) in an amount of 50 to 98 wt.-%, such as 65 to 98 wt.-%, such as 80 to 98 wt.-%, based on the dry weight of components (i), (ii), and (iii).

For the purpose of the present invention, content of lignin functional groups is determined by using 31P NMR as characterization method.

Sample preparation for 31P NMR is performed by using 2-chloro-4,4,5,5-tetramethyl-1,3,2-dioxaphospholane (TMDP) as phosphitylation reagent and cholesterol as internal standard. Integration is according to the work of Granata and Argyropoulos (J. Agric. Food Chem. 43:1538-1544).

Component (ii)

Component (ii) is in form of one or more cross-linkers.

In one embodiment, the component (ii) comprises in one embodiment one or more cross-linkers selected from β-hydroxyalkylamide-cross-linkers and/or oxazoline-cross-linkers.

β-hydroxyalkylamide-cross-linkers is a curing agent for the acid-functional macromolecules. It provides a hard, durable, corrosion resistant and solvent resistant cross-linked polymer network. It is believed the β-hydroxyalkylamide cross-linkers cure through esterification reaction to form multiple ester linkages. The hydroxy functionality of the β-hydroxyalkylamide-cross-linkers should be an average of at least 2, preferably greater than 2 and more preferably 2-4 in order to obtain optimum curing response.

Oxazoline group containing cross-linkers are polymers containing one of more oxazoline groups in each molecule and generally, oxazoline containing cross-linkers can easily be obtained by polymerizing an oxazoline derivative. The patent U.S. Pat. No. 6,818,699 B2 provides a disclosure for such a process.

In one embodiment, the component (ii) is one or more epoxy compounds having a molecular weight of more than 500, such as an epoxidised oil based on fatty acid triglyceride or one or more flexible oligomer or polymer, such as a low Tg acrylic based polymer, such as a low Tg vinyl based polymer, such as low Tg polyether, which contains reactive functional groups such as carbodiimide groups, such as anhydride groups, such as oxazoline groups, such as amino groups, such as epoxy groups, such as β-hydroxyalkylamide groups.

In one embodiment, component (ii) is one or more cross-linkers selected from the group consisting of fatty amines.

In one embodiment, component (ii) is one or more cross-linkers in form of fatty amides.

In one embodiment, component (ii) is one or more cross-linkers selected from polyester polyols, such as polycaprolactone.

In one embodiment, component (ii) is one or more cross-linkers selected from the group consisting of starch, modified starch, CMC.

In one embodiment, component (ii) is one or more cross-linkers in form of multifunctional carbodiimides, such as aliphatic multifunctional carbodiimides.

In one embodiment, the component (ii) is one or more cross-linkers in form of aziridines, such as CX100, NeoAdd-Pax 521/523.

In one embodiment, component (ii) is one or more cross-linkers selected from melamine based cross-linkers, such as a hexakis(methylmethoxy)melamine (HMMM) based cross-linkers.

Examples of such compounds are Picassian XL 701, 702, 725 (Stahl Polymers), such as ZOLDINE® XL-29SE (Angus Chemical Company), such as CX300 (DSM), such as Carbodilite V-02-L2 (Nisshinbo Chemical Inc.).

In one embodiment, component (ii) is Primid XL552, which has the following structure:

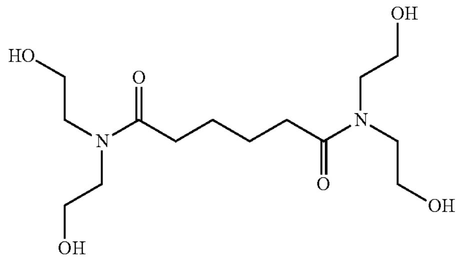

Primid XL-552

Component (ii) can also be any mixture of the above mentioned compounds.

In one embodiment, the binder composition comprises component (ii) in an amount of 1 to 50 wt.-%, such as 4 to 20 wt.-%, such as 6 to 12 wt.-%, based on the dry weight of component (i).

In one embodiment, component (ii) is in form of one or more cross-linkers selected from

- β-hydroxyalkylamide-cross-linkers, such as N-(2-hydroxyisopropyl)amide-cross-linkers, such as N-(2-hydroxyethyl)amide-cross-linkers, such as N-(2-hydroxyethyl)adipamide-cross-linkers, such as N,N,N',N'-tetrakis(2-hydroxyethyl)adipamide and/or
- the group consisting of multifunctional organic amines such as an alkanolamine, diamines, such as hexamethyldiamine, and/or
- epoxy compounds having a molecular weight of more than 500, such as an epoxidised oil based on fatty acid triglyceride or one or more flexible oligomer or polymer, such as a low Tg acrylic based polymer, such as a low Tg vinyl based polymer, such as low Tg polyether, which contains reactive functional groups such as carbodiimide groups, such as anhydride groups, such as oxazoline groups, such as amino groups, such as epoxy groups, and/or
- one or more cross-linkers in form of multifunctional carbodiimides, such as aliphatic multifunctional carbodiimides.

In one embodiment, component (ii) comprises one or more cross-linkers selected from

- β-hydroxyalkylamide-cross-linkers, such as N-(2-hydroxyisopropyl)amide-cross-linkers, such as N-(2-hydroxyethyl)amide-cross-linkers, such as N-(2-hydroxyethyl)adipamide-cross-linkers, such as N,N,N',N'-tetrakis(2-hydroxyethyl)adipamide.

In one embodiment, component (ii) comprises component (ii) in an amount of 2 to 90 wt.-%, such as 6 to 60 wt.-%, such as 10 to 40 wt.-%, such as 25 to 40 wt.-%, based on the dry weight of component (i).

Component (iii) of the Binder Composition

Optionally, the binder composition may comprise a component (iii). Component (iii) is in form of one or more plasticizers.

In one embodiment, component (iii) is in form of one or more plasticizers selected from the group consisting of polyols, such as carbohydrates, hydrogenated sugars, such as sorbitol, erythritol, glycerol, monoethylene glycol, polyethylene glycols, polyethylene glycol ethers, polyethers, phthalates and/or acids, such as adipic acid, vanillic acid, lactic acid and/or ferulic acid, acrylic polymers, polyvinyl alcohol, polyurethane dispersions, ethylene carbonate, propylene carbonate, lactones, lactams, lactides, acrylic based polymers with free carboxy groups and/or polyurethane dispersions with free carboxy groups, polyamides, amides such as carbamide/urea, or any mixtures thereof.

In one embodiment, component (iii) is in form of one or more plasticizers selected from the group consisting of carbonates, such as ethylene carbonate, propylene carbonate, lactones, lactams, lactides, compounds with a structure similar to lignin like vanillin, acetosyringone, solvents used as coalescing agents like alcohol ethers, polyvinyl alcohol.

In one embodiment, component (iii) is in form of one or more non-reactive plasticizer selected from the group consisting of polyethylene glycols, polyethylene glycol ethers, polyethers, hydrogenated sugars, phthalates and/or other esters, solvents used as coalescing agents like alcohol ethers, acrylic polymers, polyvinyl alcohol.

In one embodiment, component (iii) is one or more reactive plasticizers selected from the group consisting of carbonates, such as ethylene carbonate, propylene carbonate, lactones, lactams, lactides, di- or tricarboxylic acids, such as adipic acid, or lactic acid, and/or vanillic acid and/or ferulic acid, polyurethane dispersions, acrylic based polymers with free carboxy groups, compounds with a structure similar to lignin like vanillin, acetosyringone.

In one embodiment, component (iii) is in form of one or more plasticizers selected from the group consisting of fatty alcohols, monohydroxy alcohols such as pentanol, stearyl alcohol.

In one embodiment, component (iii) comprises one or more plasticizers selected from the group consisting of polyethylene glycols, polyethylene glycol ethers, and/or one or more plasticizers in form of polyols, such as 1,1,1-Tris (hydroxymethyl)propane, and/or triethanolamine.

Another particular surprising aspect of the binder composition used in the present invention is that the use of plasticizers having a boiling point of more than 100° C., in particular 140 to 250° C., strongly improves the mechanical properties of the bonded water attenuation layer in the structure of the present invention although, in view of their boiling point, it is likely that these plasticizers will at least in part evaporate during the curing of the binders in contact with the mineral fibres.

In one embodiment, component (iii) comprises one or more plasticizers having a boiling point of more than 100° C., such as 110 to 380° C., more preferred 120 to 300° C., more preferred 140 to 250° C.

It is believed that the effectiveness of these plasticizers in the binder composition is associated with the effect of increasing the mobility of the lignins during the curing process. It is believed that the increased mobility of the lignins during the curing process facilitates the effective cross-linking.

In one embodiment, component (iii) comprises one or more polyethylene glycols having an average molecular weight of 150 to 50000 g/mol, in particular 150 to 4000 g/mol, more particular 150 to 1000 g/mol, preferably 150 to 500 g/mol, more preferably 200 to 400 g/mol.

In one embodiment, component (iii) comprises one or more polyethylene glycols having an average molecular weight of 4000 to 25000 g/mol, in particular 4000 to 15000 g/mol, more particular 8000 to 12000 g/mol.

In one embodiment component (iii) is capable of forming covalent bonds with component (i) and/or component (ii) during the curing process. Such a component would not evaporate and remain as part of the composition but will be effectively altered to not introduce unwanted side effects e.g. undesired water absorption in the cured product. Non-limiting examples of such a component are caprolactone and acrylic based polymers with free carboxyl groups.

In one embodiment, component (iii) is selected from the group consisting of fatty alcohols, monohydroxy alcohols, such as pentanol, stearyl alcohol.

In one embodiment, component (iii) is selected from one or more plasticizers selected from the group consisting of alkoxylates such as ethoxylates such as butanol ethoxylates, such as butoxytriglycol.

In one embodiment, component (iii) is selected from one or more propylene glycols.

In one embodiment, component (iii) is selected from one or more glycol esters.

In one embodiment, component (iii) is selected from one or more plasticizers selected from the group consisting of adipates, acetates, benzoates, cyclobenzoates, citrates, stearates, sorbates, sebacates, azelates, butyrates, valerates.

In one embodiment, component (iii) is selected from one or more plasticizers selected from the group consisting of phenol derivatives such as alkyl or aryl substituted phenols.

In one embodiment, component (iii) is selected from one or more plasticizers selected from the group consisting of silanols, siloxanes.

In one embodiment, component (iii) is selected from one or more plasticizers selected from the group consisting of sulfates such as alkyl sulfates, sulfonates such as alkyl aryl sulfonates such as alkyl sulfonates, phosphates such as tripolyphosphates; such as tributylphosphates.

In one embodiment, component (iii) is selected from one or more hydroxy acids.

In one embodiment, component (iii) is selected from one or more plasticizers selected from the group consisting of monomeric amides such as acetamides, benzamide, fatty acid amides such as tall oil amides.

In one embodiment, component (iii) is selected from one or more plasticizers selected from the group consisting of quaternary ammonium compounds such as trimethylglycine, distearyldimethylammoniumchloride.

In one embodiment, component (iii) is selected from one or more fatty acid methyl esters.

In one embodiment, component (iii) is selected from one or more plasticizers selected from the group consisting of alkyl polyglucosides, gluconamides, aminoglucoseamides, sucrose esters, sorbitan esters.

In one embodiment, component (iii) is selected from the group consisting of polyethylene glycols, polyethylene glycol ethers.

In one embodiment, component (iii) is selected from the group consisting of triethanolamine.

In one embodiment, component (iii) is in form of propylene glycols, phenol derivatives, silanols, siloxanes, hydroxy acids, vegetable oils, polyethylene glycols, polyethylene glycol ethers, and/or one or more plasticizers in form of polyols, such as 1,1,1-Tris(hydroxymethyl)propane, triethanolamine, or any mixtures thereof.

It has surprisingly been found that the inclusion of plasticizers in the binder compositions strongly improves the mechanical properties of the MMVF layers that form part of the structure of the present invention.

The term plasticizer refers to a substance that is added to a material in order to make the material softer, more flexible (by decreasing the glass-transition temperature Tg) and easier to process.

Component (iii) can also be any mixture of the above mentioned compounds.

In one embodiment, component (iii) is present in an amount of 0.5 to 60, preferably 2.5 to 25, more preferably 3 to 15 wt.-%, based on the dry weight of component (i).

In one embodiment, component (iii) is present in an amount of 0.5 to 60, preferably 2.5 to 25, more preferably 3 to 15 wt.-%, based on the dry weight of components (i), (ii), and (iii).

Binder Resulting from the Curing of a Binder Composition Comprising Components (i) and (iia)

In one embodiment the MMVF water attenuation layer comprises mineral fibres in contact with a binder resulting from the curing of a binder composition for mineral fibres comprising:

a component (i) in form of one or more lignosulfonate lignins having a carboxylic acid group content of 0.03 to 2.0 mmol/g, such as 0.03 to 1.4 mmol/g, such as 0.075 to 2.0 mmol/g, such as 0.075 to 1.4 mmol/g, based on the dry weight of the lignosulfonate lignins.

a component (iia) in form of one or more modifiers, preferably with the proviso that the aqueous binder composition does not comprise a cross-linker selected from epoxy compounds having a molecular weight $M_W$ of 500 or less, and/or with the proviso that the aqueous binder composition does not comprise a cross-linker selected from carbonyl compounds selected from aldehydes, carbonyl compounds of the formula $R-[C(O)R_1]_x$ in which:

R represents a saturated or unsaturated and linear, branched or cyclic hydrocarbon radical, a radical including one or more aromatic nuclei which consist of 5 or 6 carbon atoms, a radical including one or more aromatic heterocycles containing 4 or 5 carbon atoms and an oxygen, nitrogen or sulfur atom, it being possible for the R radical to contain other functional groups, $R_1$ represents a hydrogen atom or a $C_1$-$C_{10}$ alkyl radical, and x varies from 1 to 10, and/or with the proviso that the aqueous binder composition does not comprise a cross-linker selected from polyamines, and/or with the proviso that the aqueous binder composition does not comprise a cross-linker selected from mono- and oligosaccharides.

The present inventors have found that the excellent binder properties can also be achieved by a two-component system which comprises component (i) in form of one or more lignosulfonate lignins having a carboxylic acid group content of 0.03 to 2.0 mmol/g, such as 0.03 to 1.4 mmol/g, such as 0.075 to 2.0 mmol/g, such as 0.075 to 1.4 mmol/g, based on the dry weight of the lignosulfonate lignins and a component (iia) in form of one or more modifiers, and optionally any of the other components mentioned above and below.

In one embodiment, component (iia) is a modifier in form of one or more compounds selected from the group consisting of epoxy compounds having a molecular weight of more than 500, such as an epoxidised oil based on fatty acid triglyceride or one or more flexible oligomer or polymer, such as a low Tg acrylic based polymer, such as a low Tg vinyl based polymer, such as low Tg polyether, which contains reactive functional groups such as carbodiimide groups, such as anhydride groups, such as oxazoline groups, such as amino groups, such as epoxy groups such as β-hydroxyalkylamide groups.

In one embodiment, component (iia) is one or more modifiers selected from the group consisting of polyethylene imine, polyvinyl amine, fatty amines.

In one embodiment, the component (iia) is one or more modifiers selected from multifunctional carbodiimides, such as aliphatic multifunctional carbodiimides.

Component (iia) can also be any mixture of the above mentioned compounds.

Without wanting to be bound by any particular theory, the present inventors believe that the excellent binder properties achieved by the binder composition comprising components (i) and (iia), and optional further components, are at least partly due to the effect that the modifiers used as components (iia) at least partly serve the function of a plasticizer and a cross-linker.

In one embodiment, the binder composition comprises component (iia) in an amount of 1 to 40 wt.-%, such as 4 to 20 wt.-%, such as 6 to 12 wt.-%, based on the dry weight of the component (i).

Further Components

In some embodiments, the binder comprises further components.

In one embodiment, the binder composition comprises a catalyst selected from inorganic acids, such as sulfuric acid, sulfamic acid, nitric acid, boric acid, hypophosphorous acid, and/or phosphoric acid, and/or any salts thereof such as sodium hypophosphite, and/or ammonium salts, such as ammonium salts of sulfuric acid, sulfamic acid, nitric acid, boric acid, hypophosphorous acid, and/or phosphoric acid, and/or sodium polyphosphate (STTP), and/or sodium metaphosphate (STMP), and/or phosphorous oxychloride. The presence of such a catalyst can improve the curing properties of the binder compositions.

In one embodiment, the binder composition comprises a catalyst selected from Lewis acids, which can accept an electron pair from a donor compound forming a Lewis adduct, such as $ZnCl_2$, $Mg(ClO_4)_2$, Sn $[N(SO_2\text{-n-}C_6F_{17})_2]_4$.

In one embodiment, the binder composition comprises a catalyst selected from metal chlorides, such as KCl, $MgCl_2$, $ZnCl_2$, $FeCl_3$ and $SnCl_2$ or their adducts such as $AlCl_3$ adducts, such as $BF_3$ adducts, such as $BF_3$ ethylamine complex.

In one embodiment, the binder composition comprises a catalyst selected from organometallic compounds, such as titanate-based catalysts and stannum based catalysts.

In one embodiment, the binder composition comprises a catalyst selected from chelating agents, such as transition metals, such as iron ions, chromium ions, manganese ions, copper ions and/or from peroxides such as organic peroxides such as dicumyl peroxide.

In one embodiment, the binder composition according to the present invention comprises a catalyst selected from phosphites such as alkyl phosphites, such as aryl phosphites such as triphenyl phosphite.

In one embodiment, the binder composition according to the present invention comprises a catalyst selected from the group of ternary amines such as tris-2,4,6-dimethylaminomethyl phenol.

In one embodiment, the binder composition further comprises a further component (iv) in form of one or more silanes.

In one embodiment, the binder composition comprises a further component (iv) in form of one or more coupling agents, such as organofunctional silanes.

In one embodiment, component (iv) is selected from group consisting of organofunctional silanes, such as primary or secondary amino functionalized silanes, epoxy functionalized silanes, such as polymeric or oligomeric epoxy functionalized silanes, methacrylate functionalized silanes, alkyl and aryl functionalized silanes, urea funtionalised silanes or vinyl functionalized silanes.

In one embodiment, the binder composition further comprises a component (v) in form of one or more components selected from the group of bases, such as ammonia, such as alkali metal hydroxides, such as KOH, such as earth alkaline metal hydroxides, such as $Ca(OH)_2$, such as $Mg(OH)_2$, such as amines or any salts thereof.

In one embodiment, the binder composition further comprises a further component in form of urea, in particular in an amount of 5 to 40 wt.-%, such as 10 to 30 wt.-%, 15 to 25 wt.-%, based on the dry weight of component (i).

In one embodiment, the binder composition comprises a further component in form of one or more carbohydrates selected from the group consisting of sucrose, reducing sugars, in particular dextrose, polycarbohydrates, and mixtures thereof, preferably dextrins and maltodextrins, more preferably glucose syrups, and more preferably glucose syrups with a dextrose equivalent value of DE=30 to less than 100, such as DE=60 to less than 100, such as DE=60-99, such as DE=85-99, such as DE=95-99.

In one embodiment, the binder composition comprises a further component in form of one or more carbohydrates selected from the group consisting of sucrose and reducing sugars in an amount of 5 to 50 wt.-%, such as 5 to less than 50 wt.-%, such as 10 to 40 wt.-%, such as 15 to 30 wt.-% based on the dry weight of component (i).

In the context of the present invention, a binder composition having a sugar content of 50 wt.-% or more, based on the total dry weight of the binder components, is considered to be a sugar based binder. In the context of the present invention, a binder composition having a sugar content of less than 50 wt.-%, based on the total dry weight of the binder components, is considered a non-sugar based binder.

In one embodiment, the binder composition comprises a further component in form of one or more surface active agents that are in the form of non-ionic and/or ionic emulsifiers such as polyoxyethylenes (4) lauryl ether, such as soy lecithin, such as sodium dodecyl sulfate.

The use of lignin-based sulfonated products in binders may result in an increase in the hydrophilicity of some binders and final products.

In one embodiment, the aqueous binder composition consists essentially of

- a component (i) in form of one or more lignins selected from the group of:
  - lignosulfonate lignins having a carboxylic acid group content of 0.03 to 2.0 mmol/g, such as 0.03 to 1.4 mmol/g, such as 0.075 to 2.0 mmol/g, such as 0.075 to 1.4 mmol/g, based on the dry weight of the lignosulfonate lignins, and/or
- a component (ii) in form of one or more cross-linkers;
- a component (iii) in form of one or more plasticizers;
- a component (iv) in form of one or more coupling agents, such as organofunctional silanes;
- optionally a component in form of one or more compounds selected from the group of bases, such as ammonia, such as alkali metal hydroxides, such as KOH, such as earth alkaline metal hydroxides, such as $Ca(OH)_2$, such as $Mg(OH)_2$, such as amines or any salts thereof;
- optionally a component in form of urea;
- optionally one or more surface active agents;
- water.

In one embodiment, the aqueous binder composition consists essentially of

- a component (i) in form of one or more lignins selected from the group of:
  - lignosulfonate lignins having a carboxylic acid group content of 0.03 to 2.0 mmol/g, such as 0.03 to 1.4 mmol/g, such as 0.075 to 2.0 mmol/g, such as 0.075 to 1.4 mmol/g, based on the dry weight of the lignosulfonate lignins, and/or
- a component (ii) in form of one or more cross-linkers;
- a component (iv) in form of one or more coupling agents, such as organofunctional silanes;
- optionally a component in form of one or more compounds selected from the group of bases, such as ammonia, such as alkali metal hydroxides, such as KOH, such as earth alkaline metal hydroxides, such as $Ca(OH)_2$, such as $Mg(OH)_2$, such as amines or any salts thereof;
- optionally a component in form of urea;
- optionally one or more surface active agents;
- water.

The present inventors have surprisingly found that mineral fibre products (such as water attenuation layers and growth substrate layers in the structure of the present invention) comprising mineral fibres in contact with a binder resulting in the curing of an aqueous binder composition as it is described above have at a very high stability, both when freshly produced and after aging conditions.

Further, the present inventors have found that even higher product stability can be obtained by using a curing temperature of >230° C.

In one embodiment, the present invention is therefore directed to a structure comprising a water attenuation layer comprising mineral fibres in contact with a binder resulting from the curing of an aqueous binder composition as it is described above, where the curing temperature of >230° C. is used.

The present inventors have further found that the stability of the mineral fibre layer can be further increased by the following measures:

- Lower line capacity, meaning longer curing time
- Addition of high amounts of crosslinker
- Addition of a combination of two or more different crosslinkers
- Addition of small amounts of cationic species such as multivalent metal ions such as calcium and/or organic cationic species such as amines and/or organically modified inorganic compounds such as amine modified montmorillonite clays The water attenuation layer can be produced by a method which comprises the steps of contacting mineral fibres with a binder composition comprising

- a component (i) in form of one or more lignosulfonate lignins having a carboxylic acid group content of 0.03 to 2.0 mmol/g, such as 0.03 to 1.4 mmol/g, such as 0.075 to 2.0 mmol/g, such as 0.075 to 1.4 mmol/g, based on the dry weight of the lignosulfonate lignins;
- a component (ii) in form of one or more cross-linkers;
- optionally a component (iii) in form of one or more plasticizers, preferably with the proviso that the aqueous binder composition does not comprise a cross-linker selected from

- epoxy compounds having a molecular weight $M_W$ of 500 or less and/or
- with the proviso that the aqueous binder composition does not comprise a cross-linker selected from
- carbonyl compounds selected from aldehydes, carbonyl compounds of the formula $R—[C(O)R_1]_x$
  - in which:
  - R represents a saturated or unsaturated and linear, branched or cyclic hydrocarbon radical, a radical including one or more aromatic nuclei which consist of 5 or 6 carbon atoms, a radical including one or more aromatic heterocycles containing 4 or 5 carbon atoms and an oxygen, nitrogen or sulfur atom, it being possible for the R radical to contain other functional groups,
  - $R_1$ represents a hydrogen atom or a $C_1$-$C_{10}$ alkyl radical, and
  - x varies from 1 to 10
- and/or
- with the proviso that the aqueous binder composition does not comprise a cross-linker selected from
  - polyamines
- and/or
- with the proviso that the aqueous binder composition does not comprise a cross-linker selected from
  - mono- and oligosaccharides.

Curing

The web is cured by a chemical and/or physical reaction of the binder components.

In one embodiment, the curing takes place in a curing device.

In one embodiment, the curing is carried out at temperatures from 100 to 300° C., such as 170 to 270° C., such as 180 to 250° C., such as 190 to 230° C.

In one embodiment, the curing takes place in a conventional curing oven for mineral wool production operating at a temperature of from 150 to 300° C., such as 170 to 270° C., such as 180 to 250° C., such as 190 to 230° C.

In one embodiment, the curing takes place for a time of 30 seconds to 20 minutes, such as 1 to 15 minutes, such as 2 to 10 minutes.

The curing process may commence immediately after application of the binder to the fibres. The curing is defined as a process whereby the binder composition undergoes a physical and/or chemical reaction which in case of a chemical reaction usually increases the molecular weight of the compounds in the binder composition and thereby increases the viscosity of the binder composition, usually until the binder composition reaches a solid state.

The mineral fibres employed may be any man-made vitreous fibres (MMVF), such as glass fibres, ceramic fibres, basalt fibres, slag fibres, rock fibres, stone fibres and others. These fibres may be present as a wool product, e.g. like a stone wool product.

Fibre/Melt Composition

The man-made vitreous fibres (MMVF) can have any suitable oxide composition. The fibres can be glass fibres, ceramic fibres, basalt fibres, slag fibres or rock or stone fibres. The fibres are preferably of the types generally known as rock, stone or slag fibres, most preferably stone fibres.

Stone fibres commonly comprise the following oxides, in percent by weight:

$SiO_2$: 30 to 51

$Al_2O_3$: 12 to 30

CaO: 8 to 30

MgO: 2 to 25

FeO (including $Fe_2O_3$): 2 to 15

$Na_2O+K_2O$: not more than 10

CaO+MgO: 10 to 30

In preferred embodiments the MMVF have the following levels of elements, calculated as oxides in wt %:

$SiO_2$: at least 30, 32, 35 or 37; not more than 51, 48, 45 or 43

$Al_2O_3$: at least 12, 16 or 17; not more than 30, 27 or 25

CaO: at least 8 or 10; not more than 30, 25 or 20

MgO: at least 2 or 5; not more than 25, 20 or 15

FeO (including $Fe_2O_3$): at least 4 or 5; not more than 15, 12 or 10

FeO+MgO: at least 10, 12 or 15; not more than 30, 25 or 20

$Na_2O+K_2O$: zero or at least 1; not more than 10

CaO+MgO: at least 10 or 15; not more than 30 or 25

TiO2: zero or at least 1; not more than 6, 4 or 2

$TiO_2$+FeO: at least 4 or 6; not more than 18 or 12

$B_2O_3$: zero or at least 1; not more than 5 or 3

$P_2O_5$: zero or at least 1; not more than 8 or 5

Others: zero or at least 1; not more than 8 or 5

The MMVF used in the invention preferably have the composition in wt.-%:

| | |
|---|---|
| $SiO_2$ | 35 to 50 |
| $Al_2O_3$ | 12 to 30 |
| $TiO_2$ | up to 2 |
| $Fe_2O_3$ | 3 to 12 |
| CaO | 5 to 30 |
| MgO | up to 15 |
| $Na_2O$ | 0 to 15 |

-continued

| | |
|---|---|
| K2O | 0 to 15 |
| $P_2O_5$ | up to 3 |
| MnO | up to 3 |
| $B_2O_3$ | up to 3 |

Another preferred composition for the MMVF is as follows in wt %:

$SiO_2$ 39-55% preferably 39-52%

$Al_2O_3$ 16-27% preferably 16-26%

CaO 6-20% preferably 8-18%

MgO 1-5% preferably 1-4.9%

$Na_2O$ 0-15% preferably 2-12%

$K_2O$ 0-15% preferably 2-12%

$R_2O(Na_2O+K_2O)$ 10-14.7% preferably 10-13.5%

$P_2O_5$ 0-3% preferably 0-2%

$Fe_2O_3$ (iron total) 3-15% preferably 3.2-8%

$B_2O_3$ 0-2% preferably 0-1%

$TiO_2$ 0-2% preferably 0.4-1%

Others 0-2.0%

Glass fibres commonly comprise the following oxides, in percent by weight:

$SiO_2$: 50 to 70

$Al_2O_3$: 10 to 30

CaO: not more than 27

MgO: not more than 12

Glass fibres can also contain the following oxides, in percent by weight:

$Na_2O+K_2O$: 8 to 18, in particular $Na_2O+K_2O$ greater than CaO+MgO $B_2O_3$: 3 to 12

Some glass fibre compositions can contain $Al_2O_3$: less than 2%.

The geometric mean fibre diameter is often in the range of 1.5 to 10 microns, in particular 2 to 8 microns, preferably 2 to 5 microns. The inventors found that this range of geometric fibre diameter positively affects capillarity, thus improving water uptake in the device.

Suitable fibre formation methods and subsequent production steps for manufacturing the MMVF matrix for the water attenuation layer are those conventional in the art. Generally, the binder is sprayed immediately after fibrillation of the mineral melt on to the air-borne mineral fibres. The aqueous binder composition is normally applied in an amount of 0.1 to 18%, preferably 0.2 to 8% by weight, of the bonded mineral fibre product on a dry basis.

The spray-coated mineral fibre web is generally cured in a curing oven by means of a hot air stream. The hot air stream may be introduced into the mineral fibre web from below, or above or from alternating directions in distinctive zones in the length direction of the curing oven.

Typically, the curing oven is operated at a temperature of from about 100° C. to about 300° C., such as 170 to 270° C., such as 180 to 250° C., such as 190 to 230° C. Generally, the curing oven residence time is from 30 seconds to 20 minutes, such as 1 to 15 minutes, such as 2 to 10 minutes, depending on, for instance, the product density.

If desired, the mineral wool web may be subjected to a shaping process before curing. The bonded mineral fibre product emerging from the curing oven may be cut to a desired format e.g., in the form of a batt.

The MMVF layers generally have a density within the range of from 6 to 250 kg/$m^3$, preferably 20 to 200 kg/$m^3$. The mineral fibre products generally have a loss on ignition (LOI) within the range of 0.3 to 18.0 wt.-%, preferably 0.5 to 8.0 wt.-%.

EXAMPLES

In the following examples, several binders which fall under the definition of the present invention were prepared and compared to binders according to the prior art. The following properties were determined for the binders according to the present invention and the binders according to the prior art, respectively:

Binder Component Solids Content

The content of each of the components in a given binder solution before curing is based on the anhydrous mass of the components.

Lignosulfonates were supplied by Borregaard, Norway and LignoTech, Florida as liquids with approximately 50% solid content. Primid XL552 was supplied by EMS-CHEMIE AG, Silane (Momentive VS-142 40% activity), was supplied by Momentive and was calculated as 100% for simplicity. PEG 200, urea, KOH pellets, 1,1,1 tris(hydroxymethyl)propane were supplied by Sigma-Aldrich and were assumed anhydrous for simplicity.

Binder Solids

The content of binder after curing is termed "binder solids".

Disc-shaped stone wool samples (diameter: 5 cm; height 1 cm) were cut out of stone wool and heat-treated at 580° C. for at least 30 minutes to remove all organics. The solids of the binder mixture was measured by distributing a sample of the binder mixture (approx. 2 g) onto a heat treated stone wool disc in a tin foil container. The weight of the tin foil container containing the stone wool disc was weighed before and directly after addition of the binder mixture. Two such binder mixture loaded stone wool discs in tin foil containers were produced and they were then heated at 200° C. for 1 hour. After cooling and storing at room temperature for 10 minutes, the samples were weighed and the binder solids was calculated as an average of the two results.

A binder with a desired binder solids could then be produced by diluting with the required amount of water and 10% aq. silane (Momentive VS-142).

Example 1: Water Absorption

Water absorption was measured in accordance with EN1609:2013 "Thermal insulating products for building applications-Determination of short term water absorption by partial immersion" for four different binder compositions, as shown in Table 2 below. The testing was performed using four individual test specimens in 200×200 mm in full product thickness to get one result.

Comparative Binder 1, a PUF binder, was made as follows:

A phenol-formaldehyde resin is prepared by reacting 37% aq. formaldehyde (606 g) and phenol (189 g) in the presence of 46% aq. potassium hydroxide (25.5 g) at a reaction temperature of 84° C. preceded by a heating rate of approximately 1° C. per minute. The reaction is continued at 84° C. until the acid tolerance of the resin is 4 and most of the phenol is converted. Urea (241 g) is then added and the mixture is cooled.

The acid tolerance (AT) expresses the number of times a given volume of a binder can be diluted with acid without the mixture becoming cloudy (the binder precipitates). Sulfuric acid is used to determine the stop criterion in a binder production and an acid tolerance lower than 4 indicates the end of the binder reaction.

To measure the AT, a titrant is produced from diluting 2.5 ml conc. sulfuric acid (>99%) with 1 L ion exchanged water. 5 mL of the binder to be investigated is then titrated at room temperature with this titrant while keeping the binder in motion by manually shaking it; if preferred, use a magnetic stirrer and a magnetic stick. Titration is continued until a slight cloud appears in the binder, which does not disappear when the binder is shaken.

The acid tolerance (AT) is calculated by dividing the amount of acid used for the titration (mL) with the amount of sample (mL):

AT=(Used titration volume (mL))/(Sample volume (mL))

Using the urea-modified phenol-formaldehyde resin obtained, a binder is made by addition of 25% aq. ammonia (90 mL) and ammonium sulfate (13.2 g) followed by water (1.30 kg).

The binder solids were then measured as described above and the mixture was diluted with the required amount of water and silane (15% binder solids solution, 0.5% silane of binder solids).

Comparative Binder 2 was made as follows:

3267 kg of water is charged in 6000 l reactor followed by 287 kg of ammonia water (24.7%). Then 1531 kg of Lignin UPM BioPiva 100 is slowly added over a period of 30 min to 45 min. The mixture is heated to 40° C. and kept at that temperature for 1 hour. After 1 hour a check is made on insolubilized lignin. This can be made by checking the solution on a glass plate or a Hegman gauge. Insolubilized lignin is seen as small particles in the brown binder. During the dissolution step will the lignin solution change color from brown to shiny black. After the lignin is completely dissolved, 1 liter of a foam dampening agent (Skumdæmper 11-10 from NCÅ-Verodan) is added. Temperature of the batch is maintained at 40° C. Then addition of 307.5 kg 35% hydrogen peroxide is started. The hydrogen peroxide is dosed at a rate of 200-300 l/h. First half of the hydrogen peroxide is added at a rate of 200 l/h where after the dosage rate is increased to 300 l/h.

During the addition of hydrogen peroxide is the temperature in the reaction mixture controlled by heating or cooling in such a way that a final reaction temperature of 65° C. is reached.

The final product was analysed for the COOH group content, dry solid matter, pH, viscosity and remaining $H_2O_2$. 60 g of this oxidized lignin (18.2% solids) was mixed with 1.4 g Primid XL552 (100% solids) and 2.8 g PEG200 (100% solids). 0.6 g Silane (Momentive VS-142 40% activity, 10% in water) and 17.4 g water were added and mixed to yield 15% solids.

Binder 1, according to the invention, was made as follows:

600.0 kg of ammonium lignosulfonate was placed in a mixing vessel to which 8.0 litres $NH_4OH$ (24.7%) was added and stirred. Afterwards, 190 kg Primid XL552 solution (pre-made 31 wt % solution in water) and 68 kg PEG 200 (100% solids) were added and mixed followed by addition of 11 kg Silane (Momentive VS-142 40% activity, 10% in water).

Binder 2, according to the invention, was made as follows:

730.0 kg of ammonium lignosulfonate was placed in a mixing vessel to which 8.5 l NH4OH (24.7%) was added and stirred. Afterwards, 151 kg Primid XL552 solution (pre-made 31 wt % solution in water) and 43 kg PEG 200 (100% solids) were added and mixed followed by addition of 13 kg Silane (Momentive VS-142 40% activity, 10% in water).

The results are shown below in Table 1.

As can be seen from Table 1, the water absorption for binders according to the invention is significantly higher than for the PUF binder or for the comparative lignin-based formaldehyde free binder.

TABLE 1

| Binder | water abs kg/m2 24 h |
|---|---|
| Comparative Binder 1 (PUF) | 0.10 |
| Comparative Binder 2 (oxidised lignin based Formaldehyde free) | 0.20 |
| Binder 1 | 0.60 |
| Binder 2 | 0.70 |

Example 2: Wet Strength

Wet strength was determined by submerging bars into water for four days at room temperature. The strength is measured within 20 minutes after taking out the bars from the water.

The bars were made as follows. For each binder, 16 bars were manufactured from a mixture of the binder and stone wool shots from the stone wool spinning production.

A sample of this binder solution having 15% dry solid matter (16.0 g) was mixed well with shots (80.0 g). The resulting mixture was then filled into four slots in a heat resistant silicone form for making small bars (4×5 slots per form; slot top dimension: length=5.6 cm, width=2.5 cm; slot bottom dimension: length=5.3 cm, width=2.2 cm; slot height=1.1 cm). The mixtures placed in the slots were then pressed with a suitably sized flat metal bar to generate even bar surfaces. 16 bars from each binder were made in this fashion. The resulting bars were then cured typically at 225° C. The curing time was 1 h. After cooling to room temperature, the bars were carefully taken out of the containers.

The bars were broken in a 3 point bending test (test speed: 10.0 mm/min; rupture level: 50%; nominal strength: 30 $N/mm^2$; support distance: 40 mm; max deflection 20 mm; nominal emodule10000 $N/mm^2$) on a Bent Tram machine to investigate their mechanical strengths. The bars were placed with the "top face" up (i.e. the face with the dimensions length=5.6 cm, width=2.5 cm) in the machine.

The binder according to the invention, Binder 2, is as described above for Example 1.

Comparative Binder 3 was made as follows:

A mixture of 75.1% aq. glucose syrup (19.98 g; thus efficiently 15.0 g glucose syrup), 50% aq. hypophosphorous acid (0.60 g; thus efficiently 0.30 g, 4.55 mmol hypophosphorous acid) and sulfamic acid (0.45 g, 4.63 mmol) in water (30.0 g) was stirred at room temperature until a clear solution was obtained.

28% aq. ammonia (0.80 g; thus efficiently 0.22 g, 13.15 mmol ammonia) was then added dropwise until pH=7.9. The binder solids was then measured (21.2%).

The binder mixture was diluted with water (0.403 g/g binder mixture) and 10% aq. silane (0.011 g/g binder mixture, Momentive VS-142). The final binder mixture for mechanical strength studies had pH=7.9.

Comparative Binder 1, the PUF binder, was made as described above for Example 1.

The results are shown in Table 2. As can be seen from Table 2, the wet strength of the binder according to the invention (Binder 2) was slightly lower than that of PUF, but higher than that of a comparative formaldehyde-free binder.

TABLE 2

| Binder | Binder 2 | Comparative Binder 3 (sugar-based formaldehyde free) | Comparative Binder 1 (PUF) |
|---|---|---|---|
| wet strength | 0.18 ± 0.04 | 0.15 ± 0.02 | 0.23 ± 0.08 |

Example 3: Delamination Strength after Aging

The delamination strength after aging was measured in accordance with EN1607:2013. Aging of the MMVF test specimens was achieved exposing them to heat-moisture action for 7 days at 70±2° C. and 95±5% relative humidity in climatic chamber.

Three different binders were tested:

Comparative Binder 1 as described above for Example 1.

Comparative Binder 3 as described above.

Binder 2, as described above.

The results are shown below in Table 3. As can be seen from Table 3, the delamination strength in percentage after 28 days for the product with the binder of the invention (Binder 2) is improved in comparison to another formaldehyde-free binder (Comparative Binder 3) and similar to that of Comparative Binder 1 (PUF). After 14 days, it is similar to that of PUF and better than that of the other formaldehyde-free binder-Comparative Binder 3.

TABLE 3

| | delamination in % of initial | | | |
|---|---|---|---|---|
| | 0 | 7 | 14 | 28 |
| Comparative Binder 1 | 100 | 67.1 | 64.7 | 62.0 |
| Comparative Binder 3 | 100 | 54.2 | 55.0 | 45.8 |
| Binder 2 | 100 | 70.8 | 66.7 | 57.7 |

Binder Examples

In the following examples, several binders which fall under the definition of the binder used in the present invention were prepared and compared to binders according to the prior art.

The following properties were determined for the binders used in the present invention and the binders according to the prior art, respectively:

Binder Component Solids Content

The content of each of the components in a given binder solution before curing is based on the anhydrous mass of the components.

Lignosulfonates were supplied by Borregaard, Norway and LignoTech, Florida as liquids with approximately 50% solid content. Primid XL552 was supplied by EMS-CHEMIE AG, Silane (Momentive VS-142 40% activity), was supplied by Momentive and was calculated as 100% for simplicity. NH4OH 24.7% was supplied by Univar and used in supplied form. PEG 200, urea, KOH pellets, 1,1,1 tris (hydroxymethyl)propane were supplied by Sigma-Aldrich and were assumed anhydrous for simplicity.

Binder Solids

The content of binder after curing is termed "binder solids".

Disc-shaped stone wool samples (diameter: 5 cm; height 1 cm) were cut out of stone wool and heat-treated at 580° C. for at least 30 minutes to remove all organics. The solids of the binder mixture was measured by distributing a sample of the binder mixture (approx. 2 g) onto a heat treated stone wool disc in a tin foil container. The weight of the tin foil container containing the stone wool disc was weighed before and directly after addition of the binder mixture. Two such binder mixture loaded stone wool discs in tin foil containers were produced and they were then heated at 200° C. for 1 hour. After cooling and storing at room temperature for 10 minutes, the samples were weighed and the binder solids was calculated as an average of the two results.

A binder with a desired binder solids could then be produced by diluting with the required amount of water and 10% aq. silane (Momentive VS-142).

Mechanical Strength Studies

Bar Tests

The mechanical strength of the binders was tested in a bar test. For each binder, 16 bars were manufactured from a mixture of the binder and stone wool shots from the stone wool spinning production.

A sample of this binder solution having 15% dry solid matter (16.0 g) was mixed well with shots (80.0 g). The resulting mixture was then filled into four slots in a heat resistant silicone form for making small bars (4×5 slots per form; slot top dimension: length=5.6 cm, width=2.5 cm; slot bottom dimension: length=5.3 cm, width=2.2 cm; slot height=1.1 cm). The mixtures placed in the slots were then pressed with a suitably sized flat metal bar to generate even bar surfaces. 16 bars from each binder were made in this fashion. The resulting bars were then cured typically at 225° C. The curing time was 1 h. After cooling to room temperature, the bars were carefully taken out of the containers. Five of the bars were aged in a water bath at 80° C. for 3 h. This method of curing the prepared bars was used for example in Tables 1.1, 1.2, 1.4, 1.5, 1.6. Results in Table 1.3 are based on a slightly different method which includes a preconditioning step of 2 h at 90° C., followed by curing for 1 h at 225° C. while the remaining of the procedure is the same.

After drying for 3 days, the aged bars as well as five unaged bars were broken in a 3 point bending test (test speed: 10.0 mm/min; rupture level: 50%; nominal strength: 30 $N/mm^2$; support distance: 40 mm; max deflection 20 mm; nominal e-module 10000 $N/mm^2$) on a Bent Tram machine to investigate their mechanical strengths. The bars were placed with the "top face" up (i.e. the face with the dimensions length=5.6 cm, width=2.5 cm) in the machine.

Binder Example, Reference Binder (Phenol-Formaldehyde Resin Modified with Urea, a PUF-Resol)

This binder is a phenol-formaldehyde resin modified with urea, a PUF-resol.

A phenol-formaldehyde resin is prepared by reacting 37% aq. formaldehyde (606 g) and phenol (189 g) in the presence of 46% aq. potassium hydroxide (25.5 g) at a reaction temperature of 84° C. preceded by a heating rate of approximately 1° C. per minute. The reaction is continued at 84° C. until the acid tolerance of the resin is 4 and most of the phenol is converted. Urea (241 g) is then added and the mixture is cooled.

The acid tolerance (AT) expresses the number of times a given volume of a binder can be diluted with acid without the mixture becoming cloudy (the binder precipitates). Sulfuric acid is used to determine the stop criterion in a binder production and an acid tolerance lower than 4 indicates the end of the binder reaction.

To measure the AT, a titrant is produced from diluting 2.5 ml conc. sulfuric acid (>99%) with 1 L ion exchanged water. 5 mL of the binder to be investigated is then titrated at room temperature with this titrant while keeping the binder in motion by manually shaking it; if preferred, use a magnetic stirrer and a magnetic stick. Titration is continued until a slight cloud appears in the binder, which does not disappear when the binder is shaken.

The acid tolerance (AT) is calculated by dividing the amount of acid used for the titration (mL) with the amount of sample (mL):

$$AT=(\text{Used titration volume (mL)})/(\text{Sample volume (mL)})$$

Using the urea-modified phenol-formaldehyde resin obtained, a binder is made by addition of 25% aq. ammonia (90 mL) and ammonium sulfate (13.2 g) followed by water (1.30 kg).

The binder solids were then measured as described above and the mixture was diluted with the required amount of water and silane for mechanical measurements (15% binder solids solution, 0.5% silane of binder solids).

Binder Example, Reference Binder (Binder Based on Alkali Oxidized Lignin)

3267 kg of water is charged in 6000 l reactor followed by 287 kg of ammonia water (24.7%). Then 1531 kg of Lignin UPM BioPiva 100 is slowly added over a period of 30 min to 45 min. The mixture is heated to 40° C. and kept at that temperature for 1 hour. After 1 hour a check is made on insolubilized lignin. This can be made by checking the solution on a glass plate or a Hegman gauge. Insolubilized lignin is seen as small particles in the brown binder. During the dissolution step will the lignin solution change color from brown to shiny black. After the lignin is completely dissolved, 1 liter of a foam dampening agent (Skumdæmper 11-10 from NCÅ-Verodan) is added. Temperature of the batch is maintained at 40° C. Then addition of 307.5 kg 35% hydrogen peroxide is started. The hydrogen peroxide is dosed at a rate of 200-300 l/h. First half of the hydrogen peroxide is added at a rate of 200 l/h where after the dosage rate is increased to 300 l/h.

During the addition of hydrogen peroxide is the temperature in the reaction mixture controlled by heating or cooling in such a way that a final reaction temperature of 65° C. is reached.

The final product was analysed for the COOH group content, dry solid matter, pH, viscosity and remaining $H_2O_2$. 60 g of this oxidized lignin (18.2% solids) was mixed with 1.4 g Primid XL552 (100% solids) and 2.8 g PEG200 (100% solids). 0.6 g Silane (Momentive VS-142 40% activity, 10% in water) and 17.4 g water were added and mixed to yield 15% solids and then used for test of mechanical properties in bar tests.

Binder Compositions for Use in the Present Invention

In the following, the entry numbers of the binder example correspond to the entry numbers used in Table 1-1 to 1-6.

The carboxylic acid group content of all lignosulfonates used for the binders according to the present invention was measured using 31P NMR and was found to be in the range of 0.05 to 0.6 mmol/g, based on the dry weight of the lignosulfonate lignins, for all examples.

Example 2

To 30.0 g lignosulfonate solution (50% solids), 0.4 g $NH_4OH$ (24.7%) was added and mixed followed by addition of 1.9 g Primid XL552 (100% solids) and mixing. Finally, 0.7 g Silane (Momentive VS-142 40% activity, 10% in water) and 64.3 g water were added and mixed to yield 15% solids and then used for test of mechanical properties in bar tests.

Example 11

To 30.0 g lignosulfonate solution (50% solids), 0.4 g NH4OH (24.7%) was added and mixed followed by addition of 2.1 g Primid XL552 (100% solids) and 3.4 g PEG 200 (100% solids) and mixing. Finally, 0.7 g Silane (Momentive VS-142 40% activity, 10% in water) and 61.8 g water were added and mixed to yield 15% solids and then used for test of mechanical properties in bar tests.

Example 15

To 30.0 g lignosulfonate solution (50% solids), 0.4 g $NH_4OH$ (24.7%) was added and mixed followed by addition of 2.9 g Primid XL552 (100% solids) and 3.4 g PEG 200 (100% solids) and mixing. Finally, 0.8 g Silane (Momentive VS-142 40% activity, 10% in water) and 67 g water were added and mixed to yield 15% solids and then used for test of mechanical properties in bar tests.

Example 30

To 30.0 g lignosulfonate solution (50% solids), 0.4 g $NH_4OH$ (24.7%) was added and mixed followed by addition of 2.9 g Primid XL552 (100% solids) and 3.4 g 1,1,1 tris(hydroxymethyl)propane (100% solids) and mixing. Finally, 0.8 g Silane (Momentive VS-142 40% activity, 10% in water) and 67 g water were added and mixed to yield 15% solids and then used for test of mechanical properties in bar tests.

Example 33

To 100.0 g lignosulfonate solution (50% solids), 0.3 g KOH in pellet form was added and mixed followed by addition of 10.8 g Primid XL552 (100% solids) and 11.3 g PEG 200 (100% solids) and mixing. Finally, 2.6 g Silane (Momentive VS-142 40% activity, 10% in water) and 228 g water were added and mixed to yield 15% solids and then used for test of mechanical properties in bar tests.

Example 41

To 30.0 g lignosulfonate solution (50% solids), 0.4 g $NH_4OH$ (24.7%) was added and mixed followed by addition of 1.9 g Primid XL552 (100% solids) and 1.7 g PEG 200 (100% solids) and 1.7 g urea (100% solids) and mixing. Finally, 0.7 g Silane (Momentive VS-142 40% activity, 10% in water) and 60.5 g water were added and mixed to yield 15% solids and then used for test of mechanical properties in bar tests.

Mechanical properties are presented in Tables 1.1-1.6. Further example binder compositions were prepared, as shown in Tables 1.1 to 1.6. For simplicity, quantities of all other components are recalculated based on 100 g of dry lignin.

As can be seen from Table 1.1 a combination of cross-linker (Primid XL 552) and plasticizer (PEG 200) is required to achieve high mechanical properties (unaged and aged strength in bar test) that are at comparable level to reference binder (11 and 15 versus 2 and 9 versus reference binder).

Table 1.2 and 1.3 show that different plasticizers can be used (13 and 15 versus 30) or combination of plasticizers (34 versus 41) and that the PEG 200 is a preferred plasticizer.

Table 1.4 shows that addition of silane can help achieve aged strength on the same level as reference binders.

Table 1.5 shows that the binder has high strength without the presence of a base but that a non-permanent base ($NH_4OH$) or a permanent base (KOH) can be added to the formulation to protect the production equipment from corrosion without significant changes in strength.

Table 1.6 shows that different lignosulfonates can be used.

This overall means, we are able to produce a mineral wool product based on a phenol and formaldehyde-free binder composition with a high content of renewable material based on lignin, which has comparable mechanical properties to the reference systems and can be produced in a simpler and less expensive way.

TABLE 1.1

| | Reference binder (Phenol-formaldehyde resin modified with urea, a PUF-resol) | Reference binder (binder based on alkali oxidized lignin) | 1 | 2 | 8 | 9 | 10 | 11 | 15 |
|---|---|---|---|---|---|---|---|---|---|
| Binder composition | | | | | | | | | |
| ammonium lignosulfonate (g dry lignin) | | | 100 | 100 | 100 | 100 | 100 | 100 | 100 |
| ammonium calcium lignosulfonate (g dry lignin) | | | | | | | | | |
| PEG 200 (g) | | | 0 | 0 | 23 | 40 | 23 | 23 | 23 |
| 1,1,1 tris(hydroxy-methyl)propane (g) | | | | | | | | | |
| urea (g) | | | | | | | | | |
| NH4OH (g) | | | 0.8 | 0.8 | 0.8 | 0.8 | 0.8 | 0.8 | 0.8 |
| KOH (g) | | | | | | | | | |
| Primid XL552 (g) | | | 0 | 14 | 10 | 10 | 7 | 14 | 20 |
| Momentive VS 142 (% of binder solids), based on 40% activity | | | 0.5 | 0.5 | 0.5 | 0.5 | 0.5 | 0.5 | 0.5 |
| Binder properties | | | | | | | | | |
| Mechanical strength, unaged (N), bars tests | 350 | 270 | 60 | 280 | 70 | 150 | 110 | 230 | 320 |
| Mechanical strength, aged (N), bar tests | 150 | 130 | 0 | 50 | 20 | 40 | 50 | 140 | 130 |
| Curing temp, ° C. | 200 | 225 | 225 | 225 | 225 | 225 | 225 | 225 | 225 |

TABLE 1.2

| | 12 | 13 | 15 | 26 | 27 | 28 | 29 | 30 |
|---|---|---|---|---|---|---|---|---|
| Binder composition | | | | | | | | |
| ammonium lignosulfonate (g dry lignin) | 100 | 100 | 100 | 100 | 100 | 100 | 100 | 100 |
| ammonium calcium lignosulfonate (g dry lignin) | | | | | | | | |
| PEG 200 (g) | 23 | 23 | 23 | | | | | |
| 1,1,1 tris(hydroxymethyl)propane (g) | | | | 23 | 23 | 40 | 23 | 23 |
| urea (g) | | | | | | | | |
| Primid XL552 (g) | 13 | 13 | 20 | 0 | 0 | 0 | 20 | 20 |
| NH4OH (g) | 0.8 | 0.8 | 0.8 | 0.8 | 0.8 | 0.8 | 0.8 | 0.8 |
| KOH (g) | | | | | | | | |
| Momentive VS 142 (% of binder solids), based on 40% activity | 0 | 0.5 | 0.5 | 0 | 0.5 | 0.5 | 0 | 0.5 |
| Binder properties | | | | | | | | |
| Mechanical strength, unaged (N), bars tests | 250 | 250 | 320 | 80 | 90 | 90 | 200 | 210 |
| Mechanical strength, aged (N), bar tests | 30 | 110 | 130 | 10 | 10 | 20 | 60 | 100 |
| Curing temp, ° C. | 225 | 225 | 225 | 225 | 225 | 225 | 225 | 225 |

TABLE 1.3

| | 34 | 36 | 39 | 40 | 41 |
|---|---|---|---|---|---|
| Binder composition | | | | | |
| ammonium lignosulfonate (g dry lignin) | 100 | 100 | 100 | 100 | 100 |
| ammonium calcium lignosulfonate (g dry lignin) | | | | | |
| PEG 200 (g) | 23 | 12 | 4.5 | 0 | 12 |
| 1,1,1 tris(hydroxymethyl)propane (g) | | | | | |
| urea (g) | | | | | 12 |
| Primid XL552 (g) | 13 | 13 | 13 | 13 | 13 |
| NH4OH (g) | 0.8 | 0.8 | 0.8 | 0.8 | 0.8 |
| KOH (g) | | | | | |
| Momentive VS 142 (% of binder solids), based on 40% activity | 0.5 | 0.5 | 0.5 | 0.5 | 0.5 |
| Binder properties | | | | | |
| Mechanical strength, unaged (N), bars tests | 150 | 150 | 140 | 60 | 135 |
| Mechanical strength, aged (N), bar tests | 60 | 50 | 40 | 20 | 40 |
| Curing temp, ° C. | 225 | 225 | 225 | 225 | 225 |

TABLE 1.4

| | 12 | 13 | 14 | 15 | 29 | 30 |
|---|---|---|---|---|---|---|
| Binder composition | | | | | | |
| ammonium lignosulfonate (g dry lignin) | 100 | 100 | 100 | 100 | 100 | 100 |
| ammonium calcium lignosulfonate (g dry lignin) | | | | | | |
| PEG 200 (g) | 23 | 23 | 23 | 23 | | |
| 1,1,1 tris(hydroxy-methyl)propane (g) | | | | | 23 | 23 |
| urea (g) | | | | | | |
| Primid XL552 (g) | 13 | 13 | 20 | 20 | 20 | 20 |
| NH4OH (g) | 0.8 | 0.8 | 0.8 | 0.8 | 0.8 | 0.8 |
| KOH (g) | | | | | | |
| Momentive VS 142 (% of binder solids), based on 40% activity | 0 | 0.5 | 0 | 0.5 | 0 | 0.5 |
| Binder properties | | | | | | |
| Mechanical strength, unaged (N), bars tests | 250 | 250 | 380 | 320 | 200 | 210 |
| Mechanical strength, aged (N), bar tests | 30 | 110 | 40 | 130 | 60 | 100 |
| Curing temp, ° C. | 225 | 225 | 225 | 225 | 225 | 225 |

TABLE 1.5

| | 31 | 32 | 33 |
|---|---|---|---|
| Binder composition | | | |
| ammonium lignosulfonate (g dry lignin) | 100 | 100 | 100 |
| ammonium calcium lignosulfonate (g dry lignin) | | | |
| PEG 200 (g) | 23 | 23 | 23 |
| 1,1,1 tris(hydroxymethyl)propane (g) | | | |
| urea (g) | | | |
| Primid XL552 (g) | 22 | 22 | 22 |
| NH4OH (g) | 0 | 1.0 | 0 |
| KOH (g) | 0 | 0 | 0.6 |
| Momentive VS 142 (% of binder solids), based on 40% activity | 0.5 | 0.5 | 0.5 |
| Binder properties | | | |
| Mechanical strength, unaged (N), bars tests | 330 | 300 | 290 |
| Mechanical strength, aged (N), bar tests | 160 | 120 | 130 |
| Curing temp, ° C. | 225 | 225 | 225 |

TABLE 1.6

| | 11 | 15 | 45 | 46 |
|---|---|---|---|---|
| Binder composition | | | | |
| ammonium lignosulfonate (g dry lignin) | 100 | 100 | | |
| ammonium calcium lignosulfonate (g dry lignin) | | | 100 | 100 |
| PEG 200 (g) | 23 | 23 | 23 | 23 |
| 1,1,1 tris(hydroxymethyl)propane (g) | | | | |
| urea (g) | | | | |
| Primid XL552 (g) | 13 | 20 | 13 | 20 |
| NH4OH (g) | 0.8 | 0.8 | 0.8 | 0.8 |
| KOH (g) | | | | |
| Momentive VS 142 (% of binder solids), based on 40% activity | 0.5 | 0.5 | 0.5 | 0.5 |
| Binder properties | | | | |
| Mechanical strength, unaged (N), bar tests | 230 | 320 | 210 | 300 |
| Mechanical strength, aged (N), bar tests | 140 | 130 | 120 | 130 |
| Curing temp, ° C. | 225 | 225 | 225 | 225 |

Examples 47 and 49

In the following, the entry numbers of the binder example correspond to the entry numbers used in Table 2.

The carboxylic acid group content of all lignosulfonates used for the binders according to the present invention was measured using 31P NMR and was found to be in the range of 0.05 to 0.6 mmol/g, based on the dry weight of the lignosulfonate lignins, while it was found for this specific batch used for examples 47 and 49 to be 0.14 mmol/g.

Example 47

To 30.0 g lignosulfonate solution (50% solids), 0.4 g NH4OH (24.7%) was added and mixed followed by addition of 0.7 g Silane (Momentive VS-142 40% activity, 10% in water) and 68.9 g water were added and mixed to yield 15% solids and then used for test of mechanical properties in bar tests.

Example 49

To 30.0 g lignosulfonate solution (50% solids), 0.4 g NH4OH (24.7%) was added and mixed followed by addition of 6.0 g Primid XL552 (100% solids) and mixing. Finally, 1.0 g Silane (Momentive VS-142 40% activity, 10% in water) and 102.6 g water were added and mixed to yield 15% solids and then used for test of mechanical properties in bar tests.

Mechanical properties are presented in Table 2. Further example binder compositions were prepared, as shown in Table 2. For simplicity, quantities of all other components are recalculated based on 100 g of dry lignin.

As can be seen from Table 2, in a combination of lignosulfonate and crosslinker (Primid XL 552) higher amounts of crosslinker lead to better mechanical properties.

TABLE 2

| | PUF ref | 47 | 48 | 49 | 50 |
|---|---|---|---|---|---|
| Binder composition | | | | | |
| ammonium lignosulfonate (g solids) | | 100 | 100 | 100 | 100 |
| PEG 200 (g) | | 0 | 0 | 0 | 0 |
| urea (g) | | | | | |
| ammonia, 24.7% (g) | | 2.5 | 2.5 | 2.5 | 2.5 |
| Primid XL552 (g) | | 0 | 25 | 40 | 60 |
| Momentive VS 142 (% of binder solids), based on 40% activity | | 0.5 | 0.5 | 0.5 | 0.5 |
| Binder properties | | | | | |
| Mechanical strength, unaged (N), bars tests | 350 | 60 | 280 | 460 | 640 |
| Mechanical strength, aged (N), bar tests | 150 | 0 | 160 | 180 | 230 |
| Curing temp, ° C. | 200 | 225 | 225 | 225 | 225 |

Example 53: Test of Stone Wool Product

The low density products have been examined for properties according to the product standard for Factory made mineral wool (MW) products, EN13162:2012+A1:2015, meaning relevant mechanical properties besides other basic characteristics for stone wool products.

The testing has been performed on slabs, where test specimens according to the dimensional specifications and to the number of test specimens required to get one test result, as stated in EN13162 for each of the different test methods, has been cut out. Each of the stated values for the mechanical properties obtained is an average of more results according to EN13162.

Tests are performed on products or test specimens sampled directly from the production line before packing (line cuts) and/or for products or test specimens sampled from packs 24 hours after packing (24 h packs).

Dimensions

Dimensions of products and test specimens has been performed according to the relevant test methods, EN822: 2013: Thermal insulating products for building applications-Determination of length and width, and EN823:2013: Thermal insulating products for building applications-Determination of thickness.

Binder Content (Loss on Ignition)

Determination of binder content is performed according to EN13820:2003: Thermal insulating materials for building applications—Determination of organic content, where the binder content is defined as the quantity of organic material burnt away at a given temperature, stated in the standard to be (500±20° C.). In the testing the temperature (590±20° C., for at least 10 min or more until constant mass) has been used in order to make sure that all organic material is burnt away. Determination of ignition loss consists of at least 10 g wool corresponding to 8-20 cut-outs (minimum 8 cut-outs) performed evenly distributed over the test specimen using a cork borer ensuring to comprise an entire product thickness. The binder content is taken as the LOI. The binder includes any binder additives.

Tensile Strength

The tensile strength of low density products has been determined according to EN 1608:2013: Thermal insulating products for building applications-Determination of tensile strength parallel to faces. The tensile strength is measured on test specimens from line cuts and on test specimens from 24 h packs.

Self Deflection (f70).

Self-deflection is measured according to an internal test method for determining the deflection caused by the net weight of a product. A test-specimen of length: 990±10 mm and width: min. 270±5 mm and max 680±5 mm is placed horizontally on two supports (tilting table) with a mutual centre distance of (700±2) mm and two moveable supporting devices. The self-deflection is measured in the middle of the specimen and recorded either mechanically or electrically (transducer with display) and read either on a scale or a digital display. If the original product is longer than 990±10 mm the extra length is cut off. The self-deflection is measured on both surfaces of the test specimen. The accuracy of measurement is ±0.2 mm for self-deflection <10 mm and ±1 mm for self-deflection >10 mm).

The self-deflection is reported as (f70, 70 cm span)=(f1+f2)/2 mm, where f1 is the measurement with surface 1 facing up and f2 is the measurement with surface 2 facing up.

Testing is performed on test specimens from line cuts and on test specimens from 24 h packs.

Example 53

The stone wool product has been produced by use of binder in example 53, at a curing oven temperature set to 275° C.

609.0 kg of ammonium lignosulfonate was placed in a mixing vessel to which 8 l NH4OH (24.7%) was added and stirred. Afterwards, 384 kg Primid XL552 solution (pre-made 31 wt % solution in water) was added and mixed followed by addition of 14 kg Silane (Momentive VS-142 40% activity, 10% in water).

The binder from this example is used to produce a low density stone wool product, thickness and density were measured as indicated in Table 3. Curing oven temperature was set to 275° C.

TABLE 3

| Example | Tensile strength, crosswise—packs | | | | | Tensile strength, crosswise—line cuts | | | |
|---|---|---|---|---|---|---|---|---|---|
| | Thickness mm | Ignition loss % | Self deflection f(70) mm | Sample density kg/m3 | Sigma (t) kPa | Ignition loss % | Thickness mm | Sample density kg/m3 | Sigma (t) kPa |
| PUF-reference | 145 | 2.82 | 7.2 | 32.3 | 7.6 | 2.50 | 153 | 31.0 | 10.2 |
| 53 | 139 | 2.81 | 8.9 | 34.3 | 6.7 | 2.54 | 158 | 30.7 | 8.7 |

Example 54

The stone wool product has been produced by use of binder in example 54, at a curing oven temperature set to 255° C.

730.0 kg of ammonium lignosulfonate was placed in a mixing vessel to which 8.5 l NH4OH (24.7%) was added and stirred. Afterwards, 151 kg Primid XL552 solution (pre-made 31 wt % solution in water) and 43 kg PEG 200 (100% solids) were added and mixed followed by addition of 13 kg Silane (Momentive VS-142 40% activity, 10% in water).

The binder from this example is used to produce a high density stone wool product, 100 mm thickness, 145 kg/m$^3$ density wherein the insulation element has a loss on ignition (LOI) of 3.5 wt.-%. Curing oven temperature was set to 255° C.

The invention claimed is:

1. A flat roof structure comprising at least one water attenuation layer comprising at least one water attenuation element formed of man-made vitreous fibres (MMVF) bonded with a cured binder composition, wherein the binder composition is an aqueous binder composition free of phenol and formaldehyde comprising:

a component (i) in form of one or more lignosulfonate lignins having a carboxylic acid group content of 0.03 to 2.0 mmol/g, based on the dry weight of the lignosulfonate lignins, a component (ii) in form of one or more cross-linkers;

a waterproof layer below the water attenuation layer;

and at least one drainage point in fluid communication with the water attenuation layer and arranged to direct water away from the flat roof structure, wherein each water attenuation element has a pore volume of 92 to 98 vol.-%.

2. A flat roof structure according to claim 1, which is a warm roof structure.

3. A flat roof structure according to claim 1, which is an inverted roof structure.

4. A flat roof structure according to claim 1, also comprising a thermal insulation layer below the waterproof layer.

5. A flat roof structure according to claim 1, additionally comprising a surface finish above the water attenuation layer.

6. A flat roof structure according to claim 1, in which the water attenuation layer is formed of an array of water attenuation elements.

7. A flat roof structure according to claim 1, wherein each water attenuation element comprises MMVF having a geometric fibre diameter of 1.5 to 10 microns.

8. A flat roof structure according to claim 1, wherein each water attenuation element does not comprise any wetting agent.

9. A flat roof structure according to claim 1, wherein each water attenuation element has a contact angle with water of less than 90° and/or a hydraulic conductivity of 5 m/day to 300 m/day.

10. A flat roof structure according to claim 1, wherein each water attenuation element has a density in the range 70 to 200 kg/m$^3$.

11. A flat roof structure according to claim 1, wherein each water attenuation element has a thickness greater than 50 mm up to 200 mm.

12. A flat roof structure according to claim 1, wherein each water attenuation element has a buffering capacity in the range 9.2 to 9.8 l/m$^2$×cm thickness.

13. A flat roof structure according to claim 1 in which component (i) is in the form of one or more lignosulfonate lignins having a carboxylic acid group content of 0.03 to 1.4 mmol/g, based on the dry weight of the lignosulfonate lignins.

14. A flat roof structure according to claim 1 with the proviso that the aqueous binder composition does not comprise a cross-linker selected from epoxy compounds having a molecular weight $M_W$ of 500 or less.

15. A flat roof structure according to claim 1 with the proviso that the aqueous binder composition does not comprise a cross-linker selected from:

carbonyl compounds selected from aldehydes, carbonyl compounds of the formula $R—[C(O)R_1]_x$ in which:

R represents a saturated or unsaturated and linear, branched or cyclic hydrocarbon radical, a radical including one or more aromatic nuclei which consist of 5 or 6 carbon atoms, a radical including one or more aromatic heterocycles containing 4 or 5 carbon atoms and an oxygen, nitrogen or sulfur atom, it being possible for the R radical to contain other functional groups, $R_1$ represents a hydrogen atom or a $C_1$-$C_{10}$ alkyl radical, and x varies from 1 to 10.

16. A flat roof structure according to claim 1 with the proviso that the aqueous binder composition does not comprise a cross-linker selected from polyamines.

17. A flat roof structure according to claim 1, the aqueous binder composition further comprising a component (iii) in form of one or more plasticizers.

18. A flat roof structure according to claim 1, wherein component (i) is having a carboxylic acid group content of 0.05 to 0.6 mmol/g, based on the dry weight of lignosulfonate lignins.

19. A flat roof structure according to claim 1, wherein component (i) is in form of one or more lignosulfonate lignins having an average carboxylic acid group content of less than 1.8 groups per macromolecule considering the M_n wt. average of component (i).

20. A flat roof structure according to claim 1, wherein component (i) is having a content of phenolic OH groups of 0.3 to 2.5 mmol/g, based on the dry weight of lignosulfonate lignins.

21. A flat roof structure according to claim 1, wherein component (i) is having a content of aliphatic OH groups of 1.0 to 8.0 mmol/g, based on the dry weight of lignosulfonate lignins.

22. A flat roof structure according to claim 1, wherein the component (i) comprises ammoniumlignosulfonates and/or calciumlignosulfonates, and/or magnesiumlignosulfonates, and any combinations thereof.

23. A flat roof structure according to claim 1, wherein component (i) comprises ammoniumlignosulfonates and calciumlignosulfonates, wherein the molar ratio of $NH_4^+$ to $Ca^{2+}$ is in the range of 5:1 to 1:5, in particular 3:1 to 1:3.

24. A flat roof structure according to claim 1, wherein the aqueous binder composition contains added sugar in an amount of 0 to less than 5 wt.-%, based on the weight of lignosulfonate and sugar.

25. A flat roof structure according to claim 1, wherein the aqueous binder composition comprises component (i) in an amount of 50 to 98 wt.-%, based on the dry weight of components (i) and (ii).

26. A flat roof structure according to claim 1, wherein the component (ii) is in form of one or more cross-linkers selected from β-hydroxyalkylamide-cross-linkers, and/or
oxazoline-cross-linkers, and/or
the group consisting of multifunctional organic amines, and/or
epoxy compounds having a molecular weight of more than 500, or one or more flexible oligomer or polymer, which contains reactive functional groups selected from carbodiimide groups, anhydride groups, oxazoline groups, amino groups, and epoxy groups, and/or
one or more cross-linkers selected from the group consisting of fatty amines; and/or
one more cross-linkers in form of fatty amides; and/or
one or more cross-linkers selected from polyester polyols; and/or
one or more cross-linkers selected from the group consisting of starch, modified starch, CMC; and/or
one or more cross-linkers in form of multifunctional carbodiimides; and/or
one or more cross-linkers selected from melamine based cross-linkers.

27. A flat roof structure according to claim 1, wherein the component (ii) comprises one or more cross-linkers selected from β-hydroxyalkylamide-cross-linkers and/or oxazoline-cross-linkers.

28. A flat roof structure according to claim 1, the binder composition comprising component (ii) in an amount of 1 to 50 wt.-%, based on the dry weight of component (i).

29. A flat roof structure according to claim 1, wherein the component (ii) is in form of one or more cross-linkers selected from N-(2-hydroxyisopropyl)amide-cross-linkers, N-(2-hydroxyethyl)amide-cross-linkers, N-(2-hydroxyethyl) adipamide-cross linkers, and N,N,N',N'-tetrakis(2-hydroxyethyl)adipamide and/or
the group consisting of alkanolamines and diamines, and/or
epoxy compounds having a molecular weight of more than 500, selected from epoxidised oils based on fatty acid triglycerides; or one or more flexible oligomer or polymer, selected from low Tg acrylic based polymers, which contain reactive functional groups selected from carbodiimide groups, anhydride groups, oxazoline groups, amino groups, and epoxy groups, and/or
one or more cross-linkers in form of aliphatic multifunctional carbodiimides.

30. A flat roof structure according to claim 1, wherein the component (ii) comprises one or more cross-linkers selected from β-hydroxyalkylamide-cross-linkers.

31. A flat roof structure according to claim 1, the binder composition comprising component (ii) in an amount of 2 to 90 wt.-%, based on the dry weight of component (i).

32. A flat roof structure according to claim 1, wherein component (iii) is in form of one or more plasticizers selected from the group consisting of fatty alcohols and monohydroxy alcohols; and/or
one or more plasticizers selected from the group consisting of alkoxylates; and/or
one or more plasticizers in form of propylene glycols; and/or
one or more plasticizers in form of glycol esters; and/or
one or more plasticizers selected from the group consisting of adipates, acetates, benzoates, cyclobenzoates, citrates, stearates, sorbates, sebacates, azelates, butyrates, valerates; and/or
one or more plasticizers selected from the group consisting of phenol derivatives; and/or
one or more plasticizers selected from the group consisting of silanols and siloxanes; and/or
one or more plasticizers selected from the group consisting of sulfates, sulfonates, and phosphates; and/or
one or more plasticizers in form of hydroxy acids; and/or
one or more plasticizers selected from the group consisting of monomeric amides, benzamide, and fatty acid amides; and/or
one or more plasticizers selected from the group consisting of quaternary ammonium compounds; and/or
one or more plasticizers selected from the group consisting of vegetable oils; and/or
tall oil, and/or
one or more plasticizers selected from the group consisting of hydrogenated oils and acetylated oils; and/or
one or more plasticizers selected from acid methyl esters; and/or
one or more plasticizers selected from the group consisting of alkyl polyglucosides, gluconamides, aminoglucoseamides, sucrose esters, and sorbitan esters; and/or
one or more plasticizers selected from the group consisting of polyethylene glycols and polyethylene glycol ethers; and/or
one or more plasticizers in form of polyols; and/or
triethanolamine.

33. A flat roof structure according to claim 1, wherein component (iii) is in form of propylene glycols, phenol derivatives, silanols, siloxanes, hydroxy acids, vegetable oils, polyethylene glycols, polyethylene glycol ethers, triethanolamine, or any mixtures thereof.

34. A flat roof structure according to claim 1, wherein component (iii) comprises one or more plasticizers having a boiling point of 100 to 380° C.

35. A flat roof structure according to claim 1, wherein component (iii) comprises one or more polyethylene glycols having an average molecular weight of 150 to 50000 g/mol.

36. A flat roof structure according to claim 1, wherein the component (iii) is present in the binder composition in an amount of 0.5 to 60, based on the dry weight of component (i).

37. A flat roof structure according to claim 1, the binder composition comprising a further component (iv) in form of one or more coupling agents selected from organofunctional silanes.

38. A flat roof structure according to claim 1, the binder composition further comprising a component (v) in form of one or more components selected from the group of selected from ammonia, alkali metal hydroxides, earth alkaline metal hydroxides, amines or any salts thereof.

39. A flat roof structure according to claim 1, comprising a further component in form of urea, in an amount 5 to 40 wt.-%, based on the dry weight of component (i).

40. A flat roof structure according to claim 1, wherein the water attenuation layer does not contain an ammonia-oxidized lignin (AOL).

* * * * *